(12) United States Patent
Ohashi et al.

(10) Patent No.: US 11,742,732 B2
(45) Date of Patent: Aug. 29, 2023

(54) COIL INSERTION DEVICE AND COIL INSERTION METHOD

(71) Applicant: HONDA MOTOR CO., LTD., Tokyo (JP)

(72) Inventors: Yasuto Ohashi, Tokyo (JP); Norihiko Hikima, Tokyo (JP); Shoma Okubo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/676,249

(22) Filed: Feb. 21, 2022

(65) Prior Publication Data
US 2022/0302807 A1 Sep. 22, 2022

(30) Foreign Application Priority Data
Mar. 19, 2021 (JP) ................................. 2021-045734

(51) Int. Cl.
*H02K 15/06* (2006.01)
*H02K 15/00* (2006.01)

(52) U.S. Cl.
CPC ......... *H02K 15/062* (2013.01); *H02K 15/066* (2013.01); *H02K 15/0031* (2013.01); *Y10T 29/49009* (2015.01); *Y10T 29/49073* (2015.01); *Y10T 29/53143* (2015.01)

(58) Field of Classification Search
CPC .. H02K 15/0031; H02K 15/06; H02K 15/062; H02K 15/063; H02K 15/065; H02K 15/066; Y10T 29/49009; Y10T 29/49073; Y10T 29/53143
See application file for complete search history.

(56) References Cited

U.S. PATENT DOCUMENTS

| | | | | |
|---|---|---|---|---|
| 4,571,822 A * | 2/1986 | Saito | .................. | H02K 15/0031 29/736 |
| 5,491,886 A * | 2/1996 | Kieffer | .............. | H02K 15/0037 29/736 |
| 2003/0135988 A1 | 7/2003 | Pelletta | | |
| 2017/0141659 A1 | 5/2017 | Hashimoto et al. | | |
| 2017/0187269 A1 * | 6/2017 | Noji | ........................ | H02K 3/12 |

FOREIGN PATENT DOCUMENTS

JP 6390772 B2 9/2018

* cited by examiner

*Primary Examiner* — Peter Dungba Vo
*Assistant Examiner* — Joshua D Anderson
(74) *Attorney, Agent, or Firm* — CKC & Partners Co., LLC

(57) ABSTRACT

Provided is a coil insertion device for inserting a wound coil into slots formed in a stator core and opening to a through-hole of the stator core, by placing the coil in the through-hole, and by expanding the coil to move the coil from inside toward outside with respect to the stator core. The coil insertion device includes a coil expander having a plurality of piece members arranged in an annular shape. The plurality of piece members are movable between a first position where the plurality of piece members are reduced in diameter so as to be insertable inside the wound coil, and a second position where the plurality of piece members are expanded in diameter from the first position to press the wound coil from inside toward outside, thereby inserting the wound coil into the slots at once.

8 Claims, 21 Drawing Sheets

COIL INSERTION DEVICE AND COIL INSERTION METHOD

This application is based on and claims the benefit of priority from Japanese Patent Application No. 2021-045734, filed on 19 Mar. 2021, the content of which is incorporated herein by reference.

BACKGROUND OF THE INVENTION

Field of the Invention

The present invention relates to a coil insertion device and a coil insertion method.

Related Art

There has been conventionally known a method for mounting an annularly wound coil in slots of a stator core, by inserting the annularly wound coil inside a stator core, and by pressing the coil outward from the inside of the coil onto the slots of the stator core with a roller arranged eccentrically inside the coil while the coil is rotated about an axis (for example, see Patent Document 1).

Patent Document 1: Japanese Patent No. 6390772

SUMMARY OF THE INVENTION

However, since the roller only partially presses the circumference of the coil, it is necessary to rotate the coil by one or more turns in order to insert the entire circumference of the coil into the slots. Therefore, there is a problem that man-hours are required for inserting the coil into the slots and the coil trends to be in an unstable diameter-increased state because the site of the coil pressed by the roller constantly moves in the circumferential direction of the coil.

It is an object of the present invention to provide a coil insertion device and a coil insertion method that are capable of causing a wound coil to move and expand in diameter at one time and efficiently and stably inserting the coil from the inside of a stator core into slots.

(1) An embodiment of the present invention is directed to a coil insertion device (for example, a coil insertion device 5 described later) for inserting a wound coil (for example, a belt-shaped coil 100 described later) into slots (for example, slots 22 described later) formed in a stator core (for example, a stator core 2 described later) and opening to a through-hole (for example, a through-hole 20 described later) of the stator core, by placing the wound coil in the through-hole, and by expanding the coil to move the coil from inside toward outside with respect to the stator core. The coil insertion device includes a coil expander (for example, a coil expander 53 described later) including a plurality of piece members (for example, piece members 533 described later) arranged in an annular shape. The plurality of piece members are movable between a first position where the plurality of piece members are reduced in diameter so as to be insertable inside the wound coil, and a second position where the plurality of piece members are expanded in diameter from the first position so as to press the wound coil from inside toward outside, thereby inserting the wound coil into the slots at once.

(2) In the coil insertion device described in the foregoing (1), the plurality of piece members may have a closed outer peripheral surface (for example, an outer peripheral surface 530 described later) that is continuous in a circumferential direction (for example, a C direction described later) in both the first position and the second position.

(3) An embodiment of the present invention is directed to a coil insertion method for inserting a wound coil (for example, a belt-shaped coil 100 described later) into slots (for example, slots 22 described later) formed in a stator core (for example, a stator core 2 described later) and opening to a through-hole (for example, a through-hole 20 described later) of the stator core, by placing the wound coil in the through-hole, and by expanding the coil to move the coil from inside toward outside with respect to the stator core. The coil insertion method includes: a piece member insertion step including bringing a plurality of piece members (for example, piece members 533 described later) arranged in an annular shape into a first position where the plurality of piece members are reduced in diameter to be smaller than an inner diameter of the wound coil and inserting the plurality of piece members inside the wound coil; and a coil insertion step including expanding the wound coil from inside toward outside by moving the plurality of piece members from the first position to a second position where the plurality of piece members are expanded in diameter, thereby inserting the wound coil into the slots of the stator core at once.

According to the foregoing (1), the wound coil can be expanded over the entire periphery thereof at once to be moved from inside to outside with respect to the stator core by expanding in diameter the plurality of piece members from the first position to the second position. Thus, the coil insertion device is provided which is capable of efficiently and stably inserting the coil into the slots from the inside of the stator core.

According to the foregoing (2), since no groove (gap) is formed between adjacent piece members, the coil can be further stably inserted into the slots from the inside of the stator core without disturbing the posture of the wound coil.

According to the foregoing (3), the plurality of piece members are expanded in diameter from the first position to the second position inside the wound coil, whereby the wound coil can be expanded over the entire periphery thereof at once, and moved from inside toward outside. Thus, the coil insertion method is provided which is capable of efficiently and stably inserting the coil into the slots from the inside of the stator core.

DETAILED DESCRIPTION OF THE INVENTION

Figure 1:
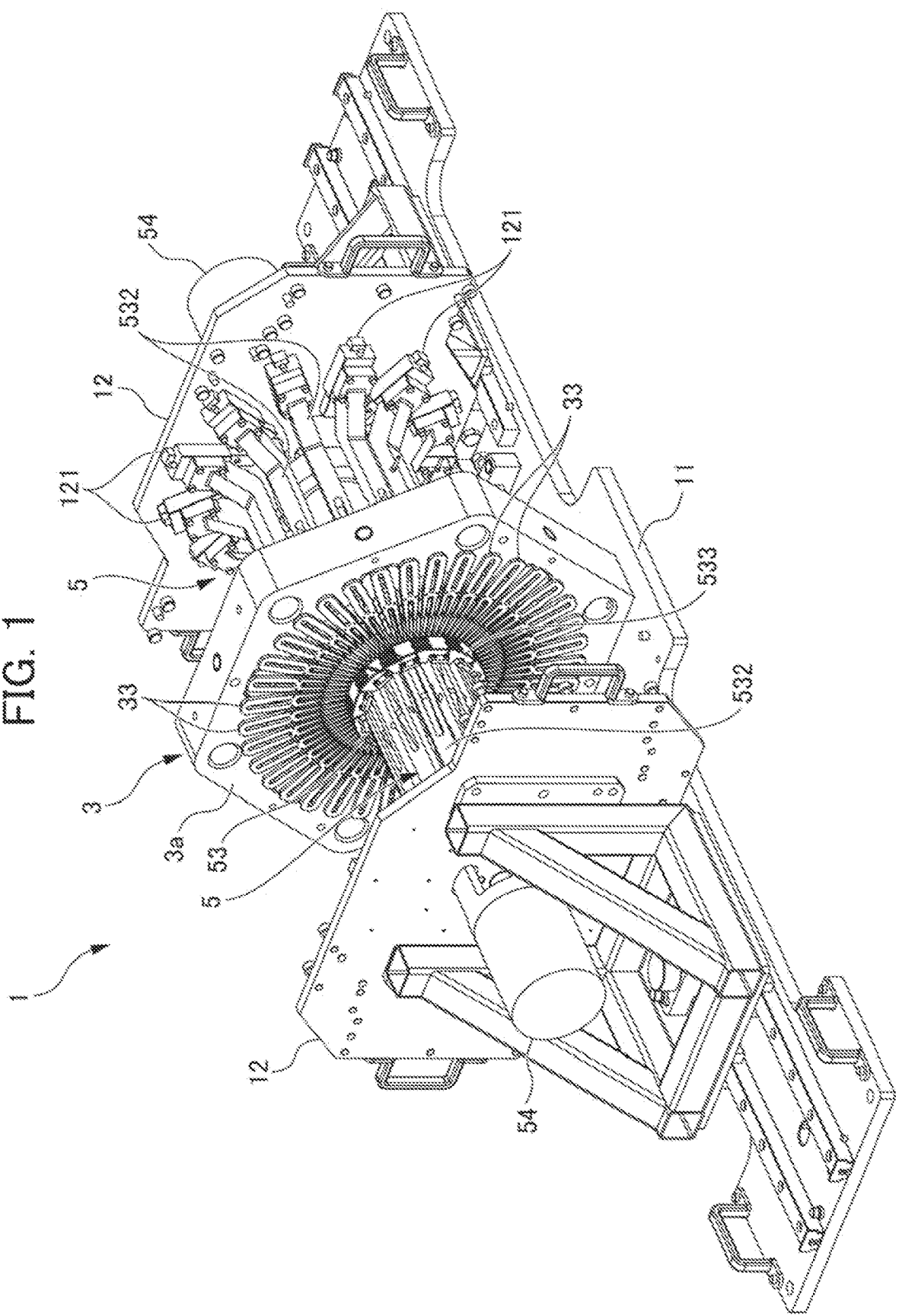
FIG. 1 is a perspective view showing a coil mounting device having a coil insertion device according to an embodiment of the present invention.
Figure 2:
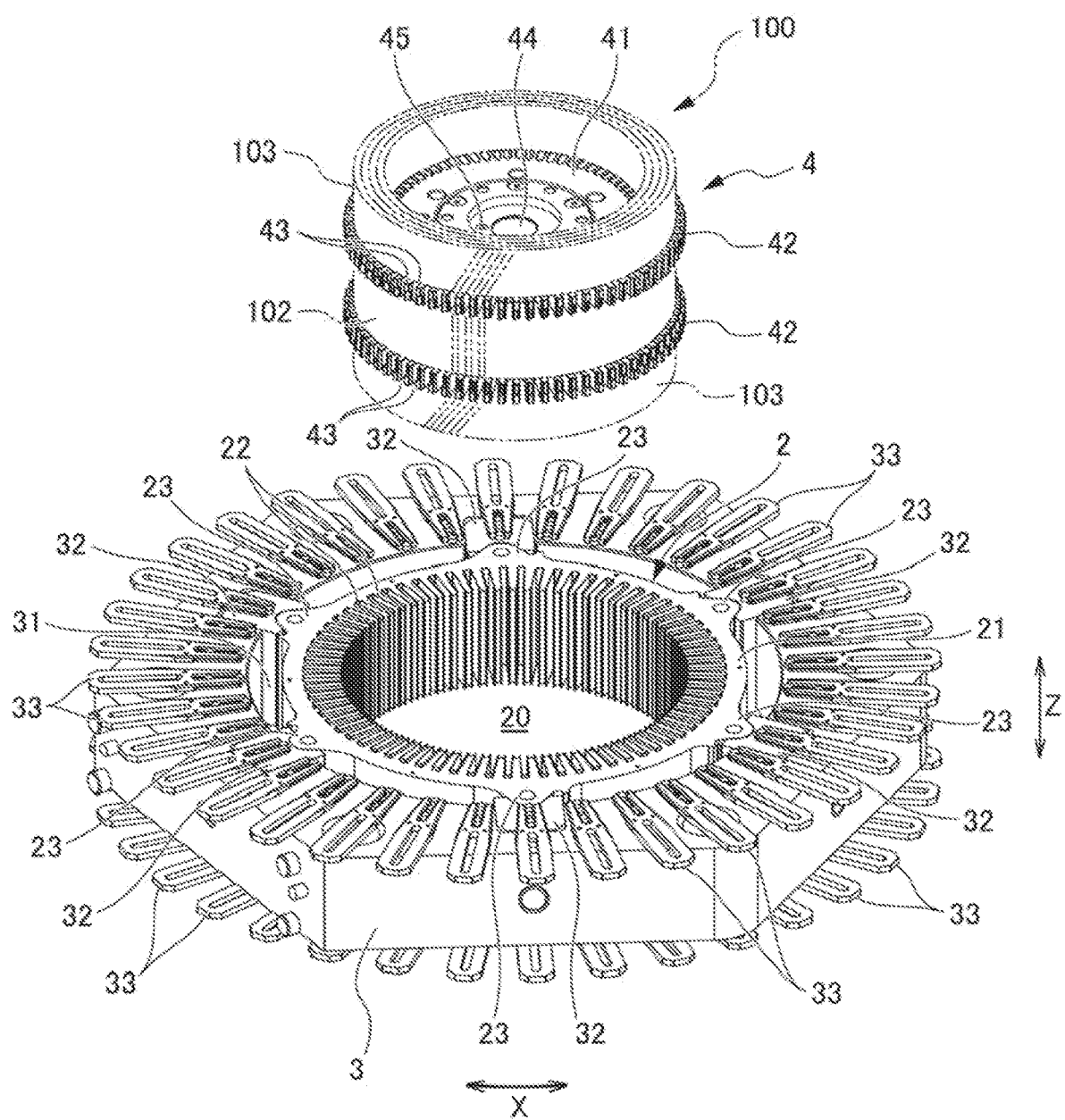
FIG. 2 is an exploded perspective view showing a stator core fixing jig having a stator core fixed thereto and a coil winding jig in a coil mounting device.

An embodiment of the present invention will be described in detail with reference to the drawings. As shown in FIGS. 1 and 2, a coil mounting apparatus 1 includes a stator core 2, a stator core fixing jig 3 for fixing the stator core 2, a coil winding jig 4 that is inserted inside the stator core 2 and winds a belt-shaped coil 100 in an annular shape, and a coil insertion device 5 for moving and expanding in diameter the belt-shaped coil 100 wound on the coil winding jig 4.

Figure 3:
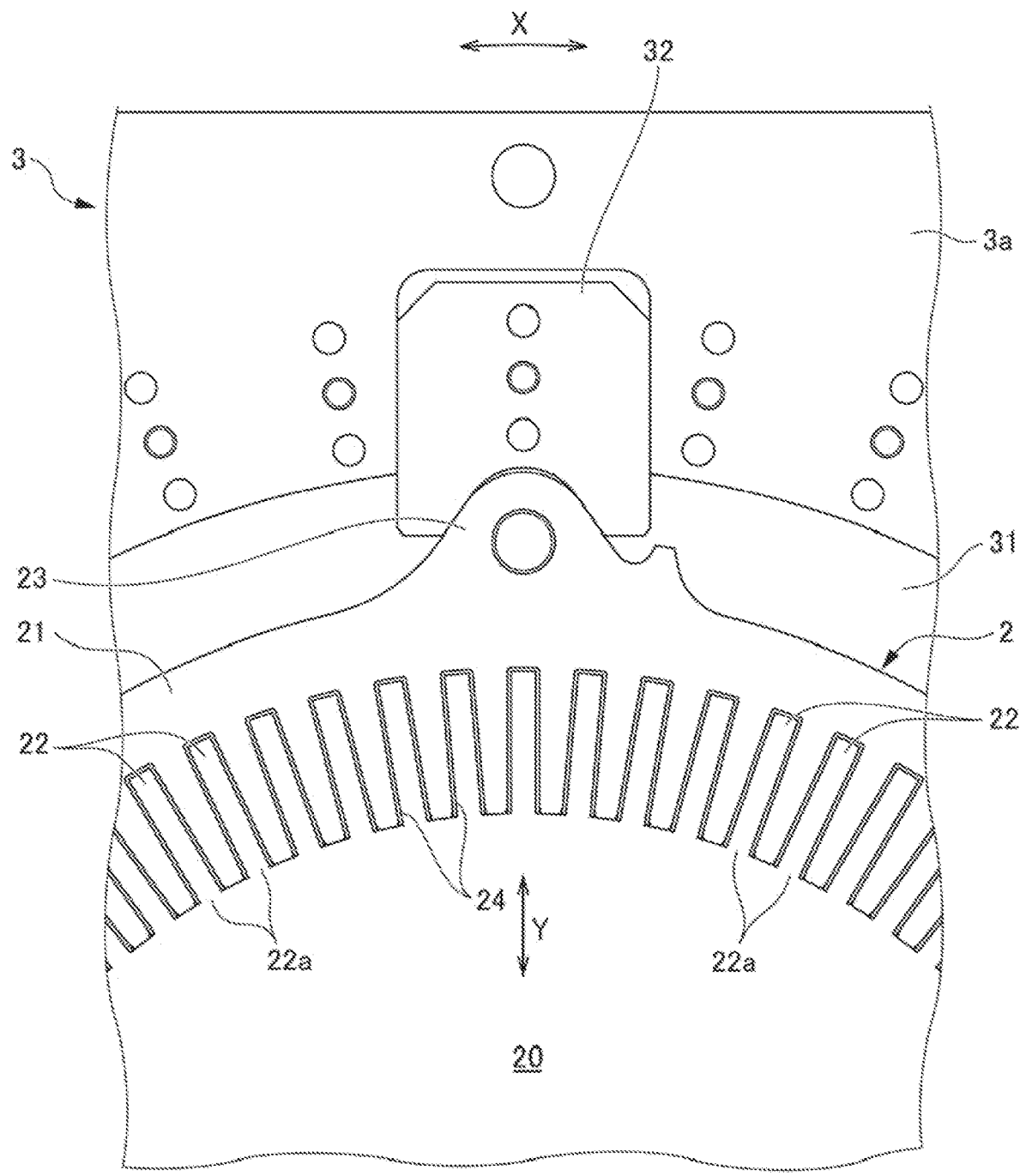
FIG. 3 is a partially enlarged view showing a fixing site of the stator core in the stator core fixing jig.

As shown in FIGS. 2 and 3, the stator core 2 includes an annular portion 21 consisting of, for example, a laminate including a plurality of thin core plates laminated together. The annular portion 21 has a through-hole 20 penetrating through the center of the annular portion 21 in an axial direction. The stator core 2 has a plurality of slots 22 penetrating therethrough in the axial direction of the stator core 2. The slots 22 are arranged radially at regular intervals along the circumferential direction of an annular portion 21, and have openings 22a that open to the through-hole 20. The stator core 2 of the present embodiment has 72 slots 22. The annular portion 21 has six tabs 23 protruding at regular intervals from the outer circumference of the annular portion 21 of the stator core 2. As shown in FIGS. 2 and 3, with respect to the stator core 2, an X direction in which the slots 22 are arranged refers to the circumferential direction, a Y direction extending radially from the center of the through-hole 20 refers to the radial direction, and a Z direction shown in FIG. 2 (the direction perpendicular to the page of FIG. 3) refers to the axial direction.

As shown in FIGS. 1, 2, and 3, the stator core fixing jig 3 has a hexagonal cylinder shape having an axial dimension which is substantially equal to the axial dimension of the stator core 2, and has, at the center thereof, a stator core insertion hole 31 in which the stator core 2 can be inserted and arranged. In the coil mounting apparatus 1 of the present embodiment, the stator core fixing jig 3 is fixed to a center portion of a base 11 of the coil mounting apparatus 1 so that the axial direction of the stator core 2 fixed in the stator core insertion hole 31 is parallel to the horizontal direction.

The stator core fixing jig 3 fixes the stator core 2 in the stator core insertion hole 31 at a predetermined position and in a predetermined posture. Specifically, as shown in FIGS. 2 and 3, the stator core fixing jig 3 has six core holding blocks 32 which are provided so as to correspond to the positions of the six tabs 23 of the stator core 2 and are movable so as to protrude into and retract from the inside of the stator core insertion hole 31. After the stator core 2 is inserted into the stator core insertion hole 31, the stator core fixing jig 3 causes the core holding blocks 32 to protrude into the stator core insertion hole 31 by driving an actuator such as a cylinder (not shown). As a result, as shown in FIG. 2, the core holding blocks 32 grip the tabs 23 of the stator core 2 respectively to fix the stator core 2 in the stator core insertion hole 31 at a predetermined position and in a predetermined posture.

Figure 4:
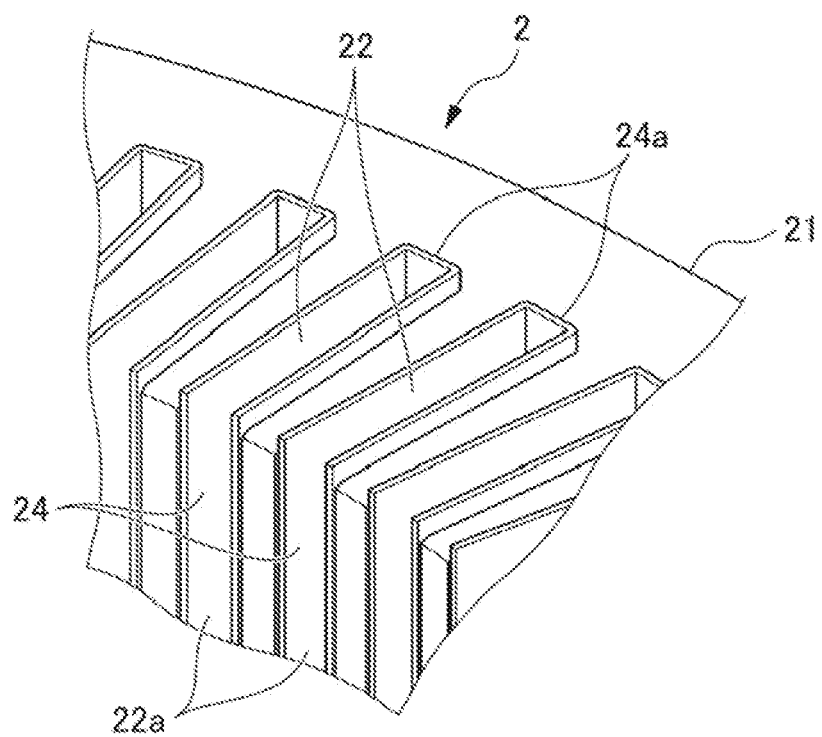
FIG. 4 is a perspective view showing insulating paper sheets disposed in slots of the stator core.

As shown in FIGS. 2 and 3, an insulating paper sheet. 24 is disposed in advance in each of the slots 22 of the stator core 2 in advance. The insulating paper sheet 24 has a shape folded in a substantially U-shape so as to follow the shape of the inner surface of the slot 22 that is a substantially U-shape when the stator core 2 is viewed in the axial direction. As shown in FIG. 4, the insulating paper sheet 24 disposed in each of the slots 22 has a cuff portion 24a protruding from the slot 22 in the axial direction of the stator core 2 by a predetermined height. The cuff portions 24a protrude from the slots 22 to both outer sides of the stator core 2 in the axial direction.

As shown in FIG. 2, a plurality of cuff guides 33 are attached to both axial end faces 3a, 3a of the stator core fixing jig 3 to which the stator core 2 is fixed in advance, so that the cuff guides 33 are radially arranged at regular intervals along the circumferential direction. The cuff guides 33 are provided so as to be movable forward and backward along the radial direction of the stator core 2 by driving an actuator such as a cylinder (not shown). In FIG. 3, the cuff guides 33 are not illustrated in order to facilitate the understanding of the explanation of the core holding blocks 32.

Figure 5:
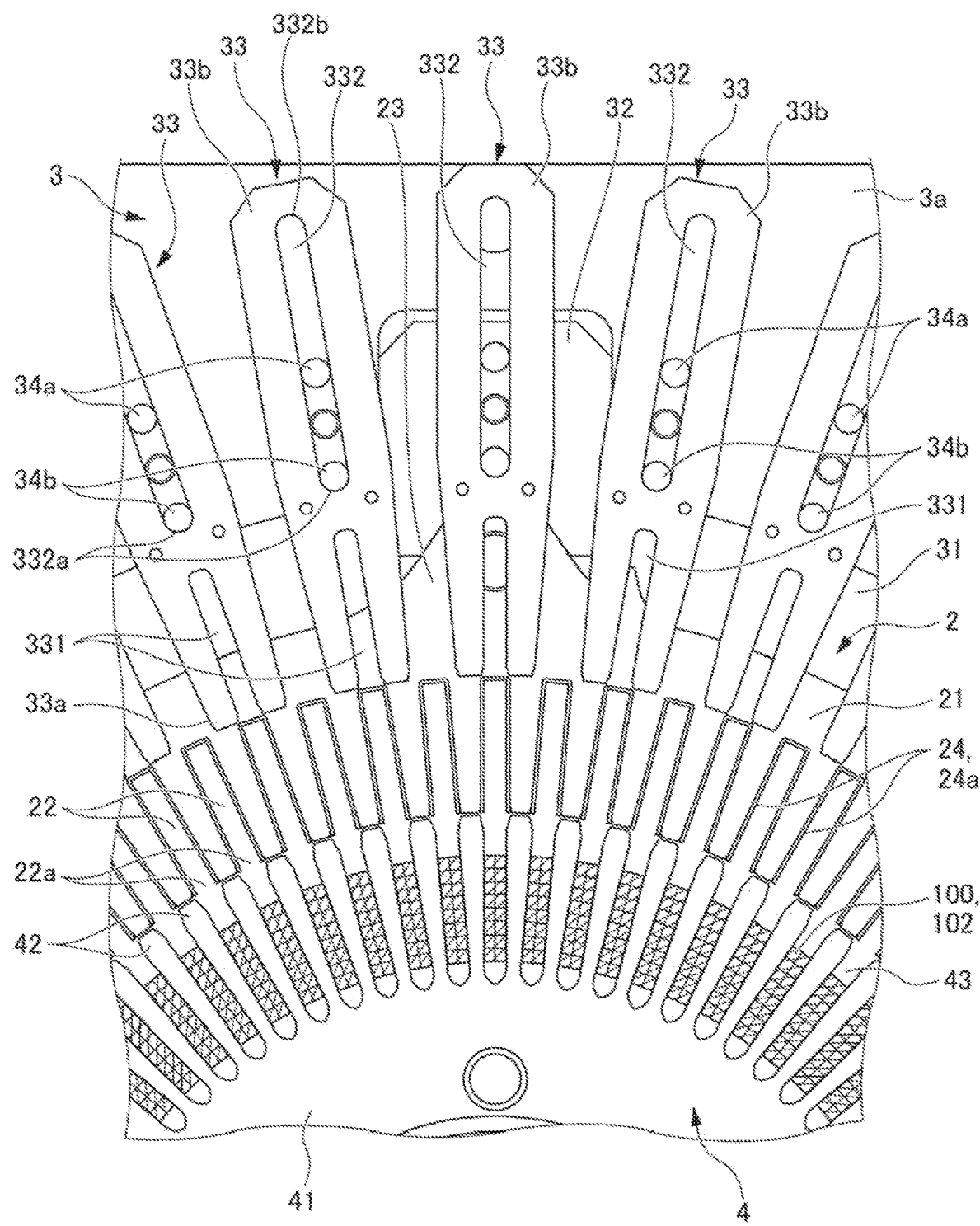
FIG. 5 is a partially enlarged view showing a state in which the slots of the stator core and inter-comb-teeth grooves of a coil winding jig are matched in phase with each other.

The cuff guides 33 are formed in an elongated thin-plate shape along the radial direction of the stator core 2. As shown in FIG. 5, each of the cuff guides 33 has, near its inner end 33a, a guide groove 331 which opens to the inside of the stator core fixing jig 3 and supports the cuff portion 24a of the insulating paper sheet 24 from both sides. The guide groove 331 extends in the length direction of the cuff guides 33. Each guide groove 331 is a U-shaped notch having a notch width which is slightly smaller than the width of the slot 22 of the stator core 2 in the circumferential direction.

Each cuff guide 33 has, near its outer end 33b that is located outside with respect to the guide groove 331, an elongated hole 332 for restricting a radial movement range of the cuff guide 33.

The stator core fixing jig 3 has, on both end faces 3a, 3a, pairs of inner diameter side restriction pins 34a and outer diameter side restriction pins 34b, such that each of the pairs corresponds to one of the cuff guides 33. The cuff guides 33 are mounted on both the end faces 3a, 3a of the stator core fixing jig 3 such that the elongated hole 332 of each cuff guide 33 has the corresponding pair of inner and outer diameter side restriction pins 34a and 34b engaged with the inside of the corresponding elongated hole 332.

As shown in FIG. 2, the inner diameter side restriction pin 34a comes into contact with the inner end portion 332a of the elongated hole 332 when the cuff guide 33 moves outward in the radial direction of the stator core fixing jig 3, whereby the cuff guide 33 is positioned at a non-guide position that is an outermost position in the radial direction. At the non-guide position, the inner end 33a of the cuff guide 33 is positioned outward with respect to the stator core insertion hole 31 in the radial direction.

The outer diameter side restricting pin 34b comes into contact with the outer end portion 332b of the elongated hole 332 when the cuff guide 33 moves inward in the radial direction of the stator core fixing jig 3, whereby the cuff guide 33 is positioned at a guide position that is an innermost position in the radial direction. At this time, the inner end 33a of the cuff guide 33 is positioned radially outside the coil winding jig 4 (see FIGS. 18 and 19).

The stator core 2 is inserted into the stator core insertion hole 31 of the stator core fixing jig 3 from either side in the axial direction. Therefore, as shown in FIG. 5, the cuff guides 33 arranged on the side opposite to the insertion side of the stator core 2 may be arranged so that the inner ends 33a of the cuff guides 33 interfere with the annular portion 21 of the stator core 2 in a state where the outer diameter side restricting pins 34b are in contact with the inner end portions 332a of the elongated holes 332. However, the inner diameter side restriction pins 34a and the outer diameter side restriction pins 34b may be configured to selectively protrude from and be recessed into the surface of the stator core fixing jig 3 by an advance-retreat mechanism (not shown) having an actuator such as a cylinder provided inside the stator core fixing jig 3. As a result, when the cuff guides 33 are arranged as shown in FIG. 5, the inner diameter side restriction pins 34a and the outer diameter side restriction pins 34b are recessed into the surface of the stator core fixing jig 3 as necessary, whereby the cuff guides 33 can be further moved outward in the radial direction so that the cuff guides 33 are completely retracted from the annular portion 21 of the stator core 2 as shown in FIG. 2.

The stator core fixing jig 3 of the present embodiment has thirty-six cuff guides 33 on each of the two faces 3a, 3a. When the cuff guides 33 are moved toward the inside of the stator core fixing jig 3 in the radial direction and positioned at guide positions, the cuff guides 33 are arranged so that the separation distance in the circumferential direction between the inner ends 33a of the adjacent cuff guides 33 coincides with the notch width of the guide groove 331.

Figure 6:
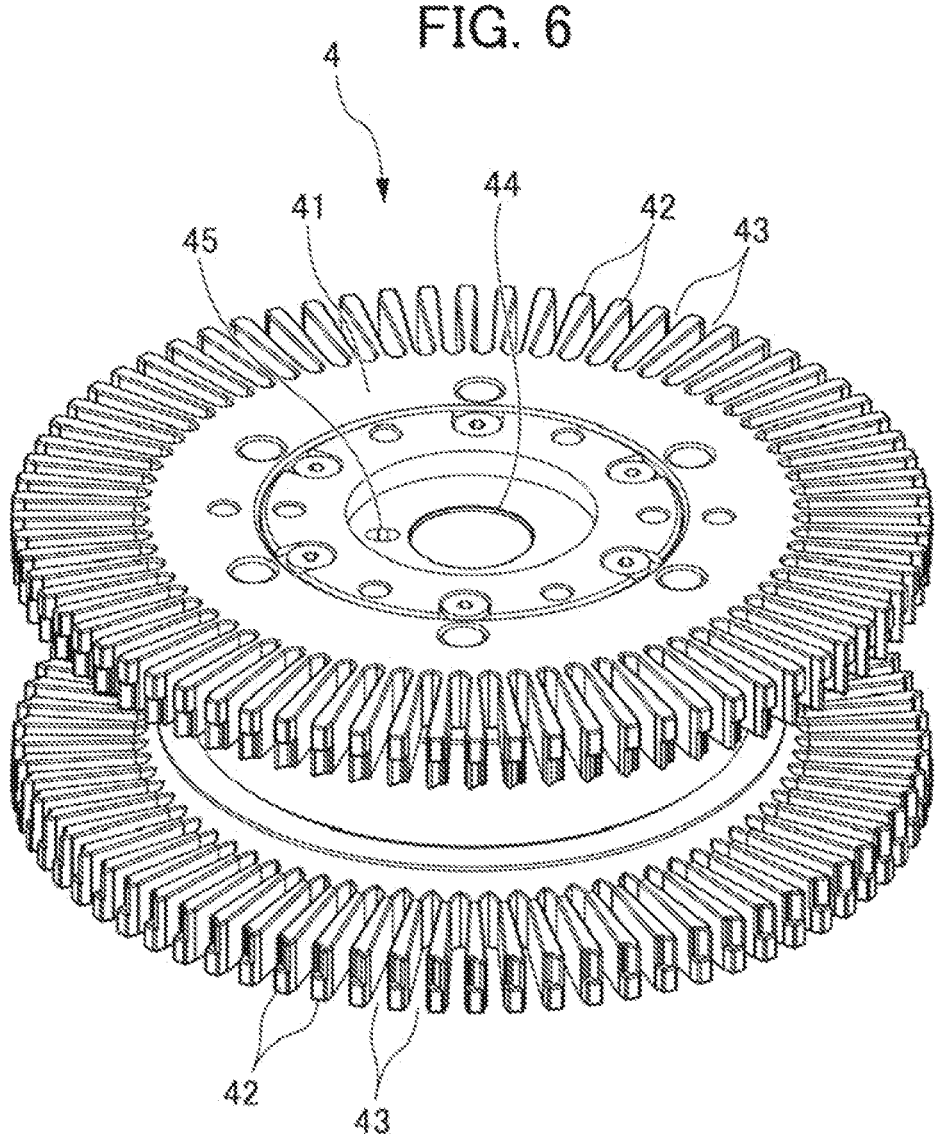
FIG. 6 is a perspective view showing a coil winding jig.

As shown in FIG. 6, the coil winding jig 4 includes a substantially cylindrical jig body 41, a plurality of comb teeth 42 radially protruding from the outer periphery of the jig body 41, and a plurality of inter-comb-teeth grooves 43 each of which is defined by the comb teeth 42 adjacent to each other in the circumferential direction, and a shaft hole 44 opened in the center of the jig body 41.

The comb teeth 42 and the inter-comb-teeth grooves 43 are provided at both axial end portions of the jig body 41. The phases of the comb teeth 42 and the inter-comb-teeth grooves 43 at both the axial end portions of the jig body 41 are aligned in the axial direction. The number of inter-comb-teeth grooves 43 arranged in the circumferential direction of the jig body 41 is the same as the number of slots 22 provided in the stator core 2. Therefore, the coil winding jig 4 of the present embodiment has seventy-two inter-comb-teeth grooves 43. The coil winding jig 4 is configured so that the outer diameter of the coil winding jig 4 defined by the positions of the tips of the comb teeth 42 is smaller than the inner diameter of the stator core 2, whereby coil winding jig 4 is insertable into the annular portion 21 of the stator core 2.

A belt-shaped coil 100 to be mounted in the stator core 2 is wound around the coil winding jig 4 in an annular shape. The belt-shaped coil 100 is an elongated belt-shaped coil which include flat conducting wires 101 having a substantially rectangular cross-sectional shape. The flat conducting wire 101 is includes a highly conductive metal, such as copper or aluminum.

Figure 7:
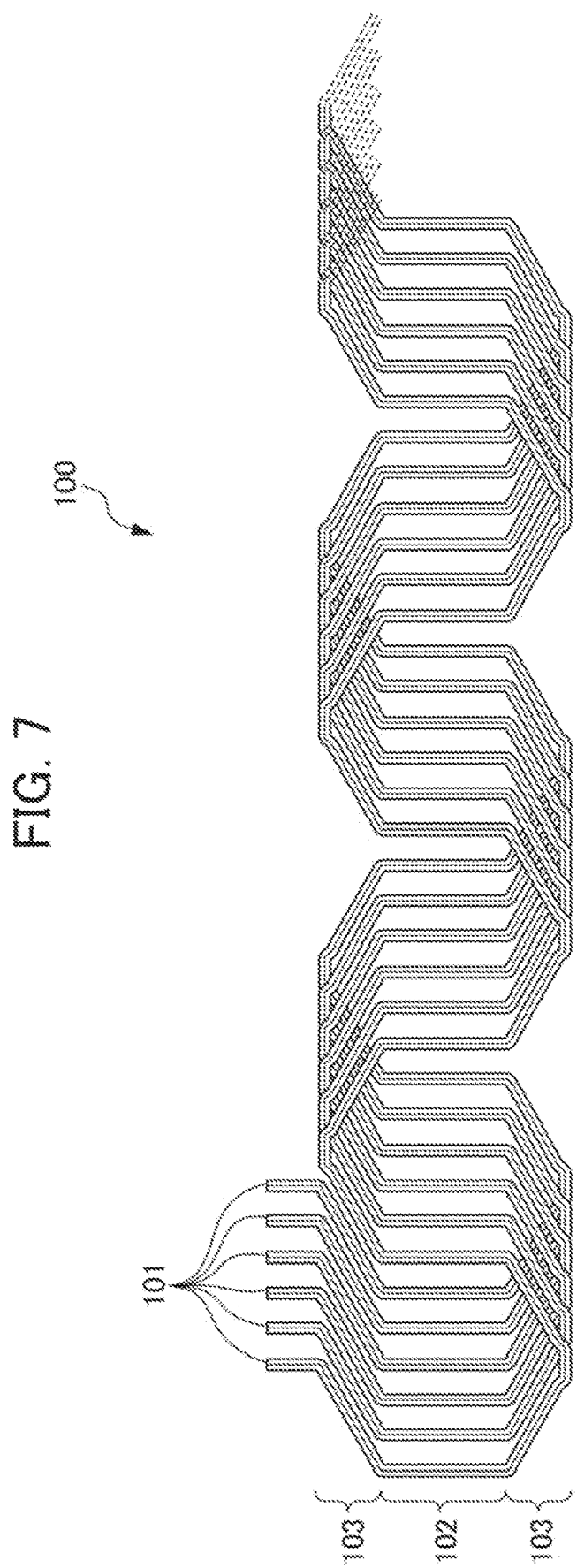
FIG. 7 is a front view showing a belt-shaped coil.

As shown in FIG. 7, the belt-shaped coil 100 has a plurality of straight portions 102 and a plurality of coil end portions 103. The straight portions 102 are sites to be inserted into the slots 22 of the stator core 2, and they extend substantially linearly and are arranged in parallel at regular intervals. The coil end portions 103 are arranged at positions nearer to the side ends of the belt-shaped coil 100 than the straight portions 102, and alternately connect end portions of adjacent straight portions 102 to each other and the opposite end portions of the adjacent straight portions 102 to each other in a substantially triangular chevron-like shape. The coil end portions 103 are sites which are arranged so as to protrude from the slots 22 in the axial direction of the stator core 2 when the belt-shaped coil 100 is mounted in the slots 22 of the stator core 2. The belt-shaped coil 100 of the present embodiment is formed in an elongated belt-shape by bundling six flat conducting wires 101 each of which is bent to have the plurality of straight portions 102 and the plurality of coil end portions 103, so that the straight portions 102 are arranged side by side in parallel at regular intervals.

Figure 8:
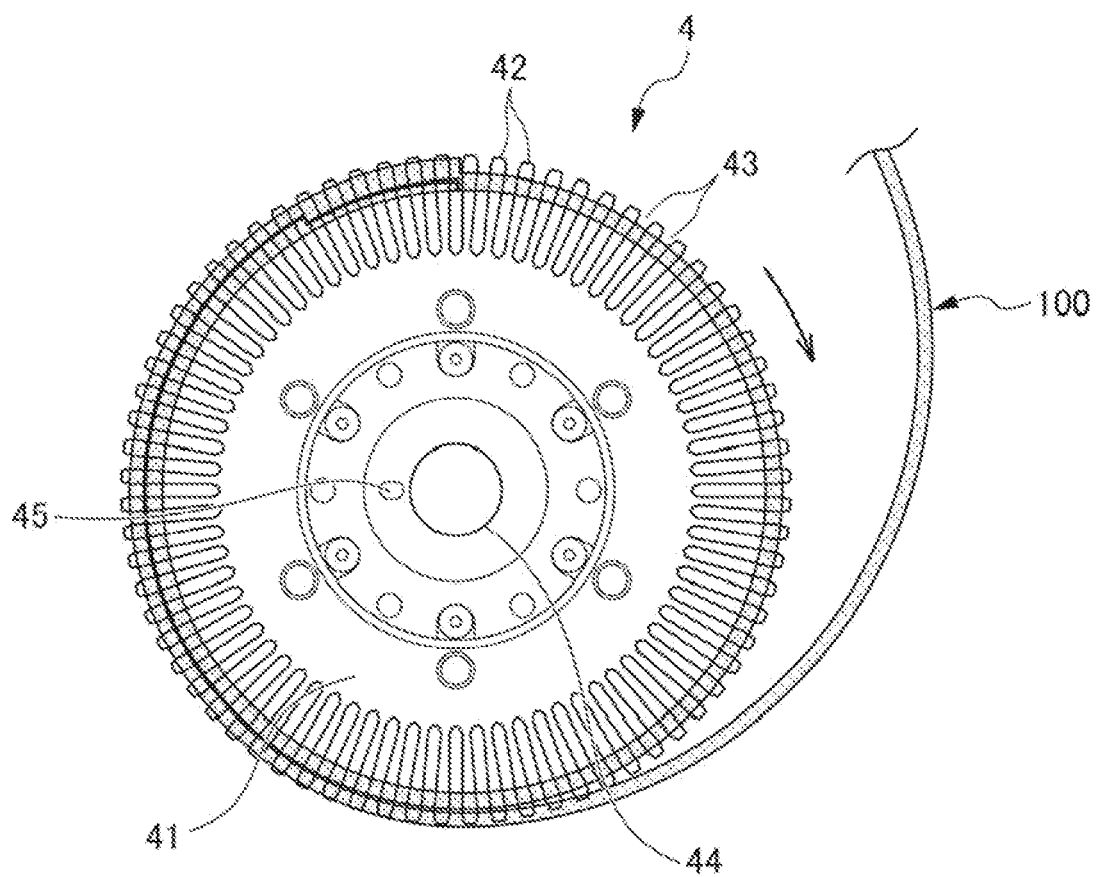
FIG. 8 is a plan view showing a state in which the belt-shaped coil is wound around the coil winding jig.
Figure 9:
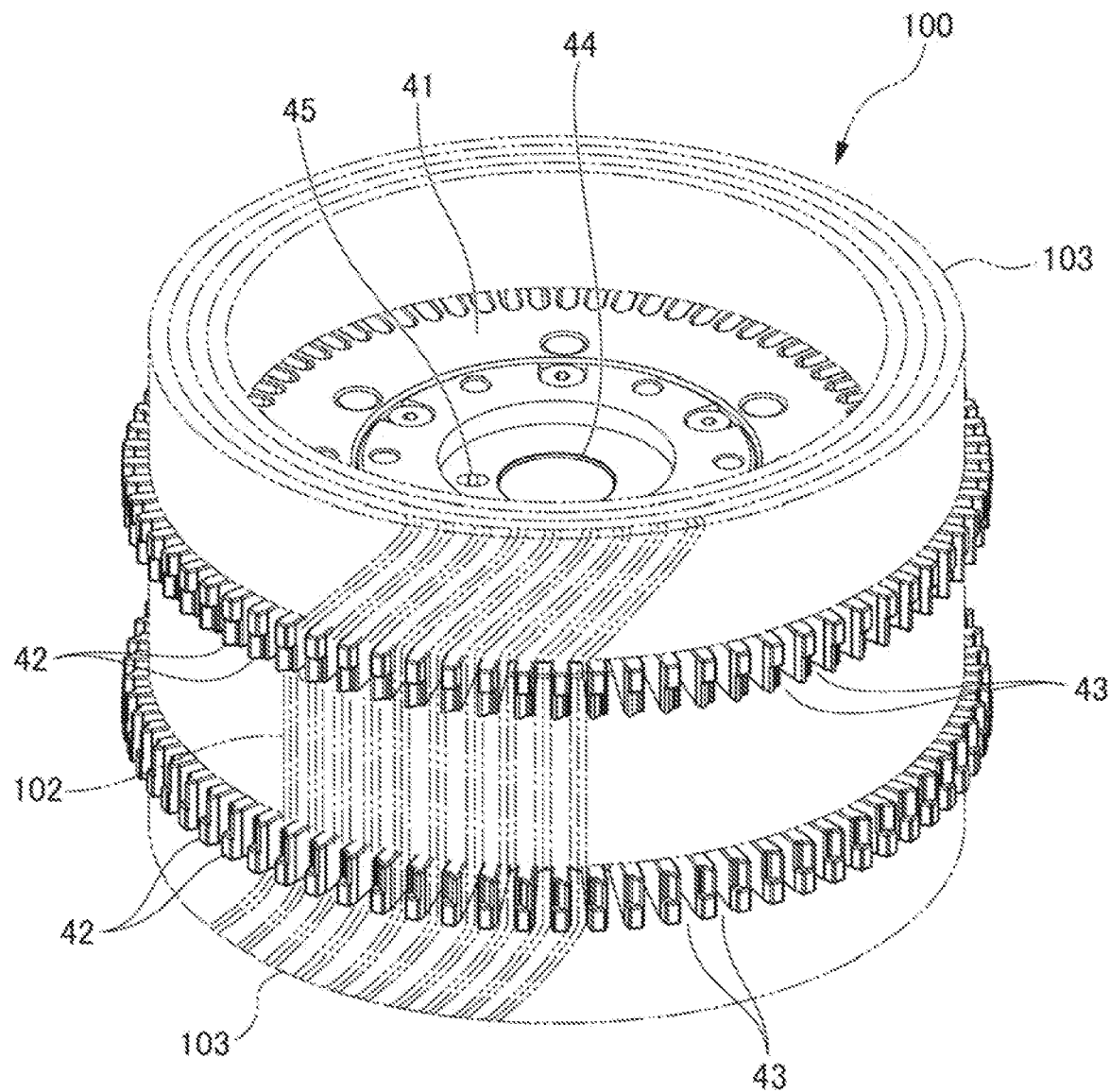
FIG. 9 is a perspective view showing the coil winding jig having the belt-shaped coil wound therearound.

As shown in FIG. 8, before the coil winding jig 4 is inserted inside the stator core 2, the straight portions 102 of the belt-shaped coil 100 are sequentially inserted into the inter-comb-teeth grooves 43 from outside, whereby the coil winding jig 4 has thereon the belt-shaped coil 100 wound by multiple turns. As a result, as shown in FIG. 9, the coil winding jig 4 on which the belt-shaped coil 100 is wound in an annular shape is prepared (coil winding step).

The inter-comb-teeth grooves 43 arranged on the coil winding jig 4 in the circumferential direction has a groove width can receive the straight portion 102 of the belt-shaped coil 100, but the groove width is slightly smaller than the opening width of the opening 22a of each slot 22 in the circumferential direction of the stator core 2.

The distance between the comb teeth 42 in the axial direction of the jig body 41 corresponds to the length of the straight portion 102 of the belt-shaped coil 100. Therefore, the straight portions 102 of the belt-shaped coil 100 wound around the coil winding jig 4 are each received to fully extend between two inter-comb-teeth grooves 43, 43 that coincide in phase with each other and are respectively located at one end and the other end of the jig body 41. The coil end portions 103 of the belt-shaped coil 100 wound by multiple turns protrude from the inter-comb-teeth grooves 43 in the axial direction of the jig body 41 so as to form cylindrically shapes. As shown in FIGS. 1, 2 and 3, the coil winding jig 4 having thereon the belt-shaped coil 100 wound in an annular shape as described above is inserted inside the stator core 2 fixed to the stator core fixing jig 3 by, for example, a motion of a robot (not shown). FIG. 1 does not illustrate the belt-shaped coil 100 of the coil winding jig 4.

The coil winding jig 4 inserted inside the stator core 2 is held at a predetermined position and in a predetermined posture by the coil insertion devices 5 that are arranged on both sides of the stator core fixing jig 3 with the stator core fixing jig 3 interposed therebetween. As shown in FIG. 1, the coil insertion device 5 of the present embodiment has a substantially cylindrical appearance shape, and face, in the axial direction, the coil winding jig 4 inserted inside the stator core 2.

Figure 10:
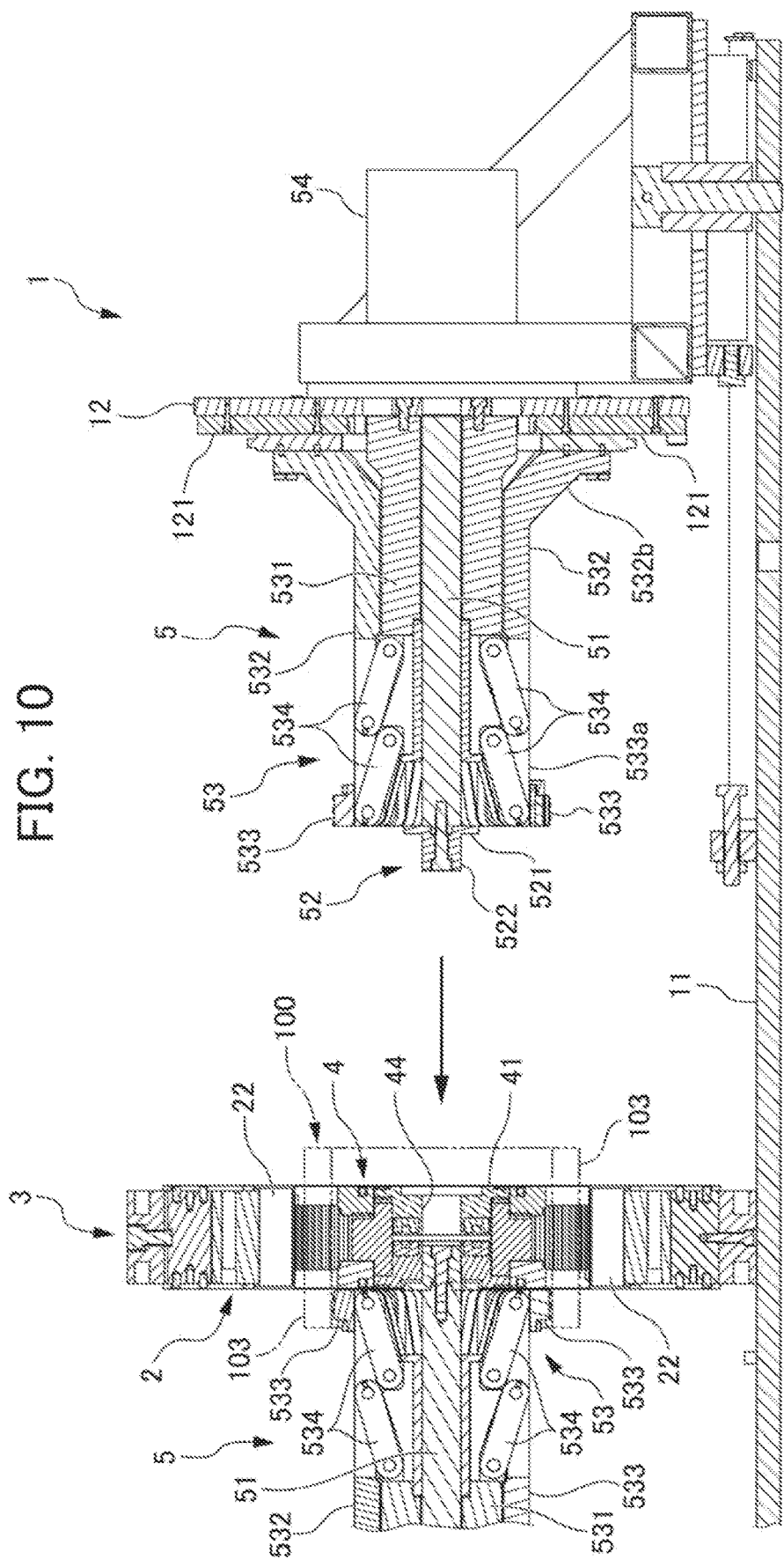
FIG. 10 is a cross-sectional side view showing an aspect in which a coil insertion device is mounted on a coil winding jig inserted inside the stator core.

As shown in FIGS. 1 and 10, the coil mounting apparatus 1 include a pair of support substrates 12, 12 standing on the base 11 that fixes the positioning jig 3, so that they face each other with the positioning jig 3 disposed therebetween. Each of the coil insertion devices 5 protrudes horizontally from the support board 12 toward the coil winding jig 4 inserted inside the stator core 2. The coil insertion devices 5 are movable in a direction in which they come into contact with the coil winding jig 4 and in a direction in which they separate from the coil winding jig 4 when the support boards 12 are linearly moved on the base 11 by driving a motor (not shown) or the like.

Figure 11:
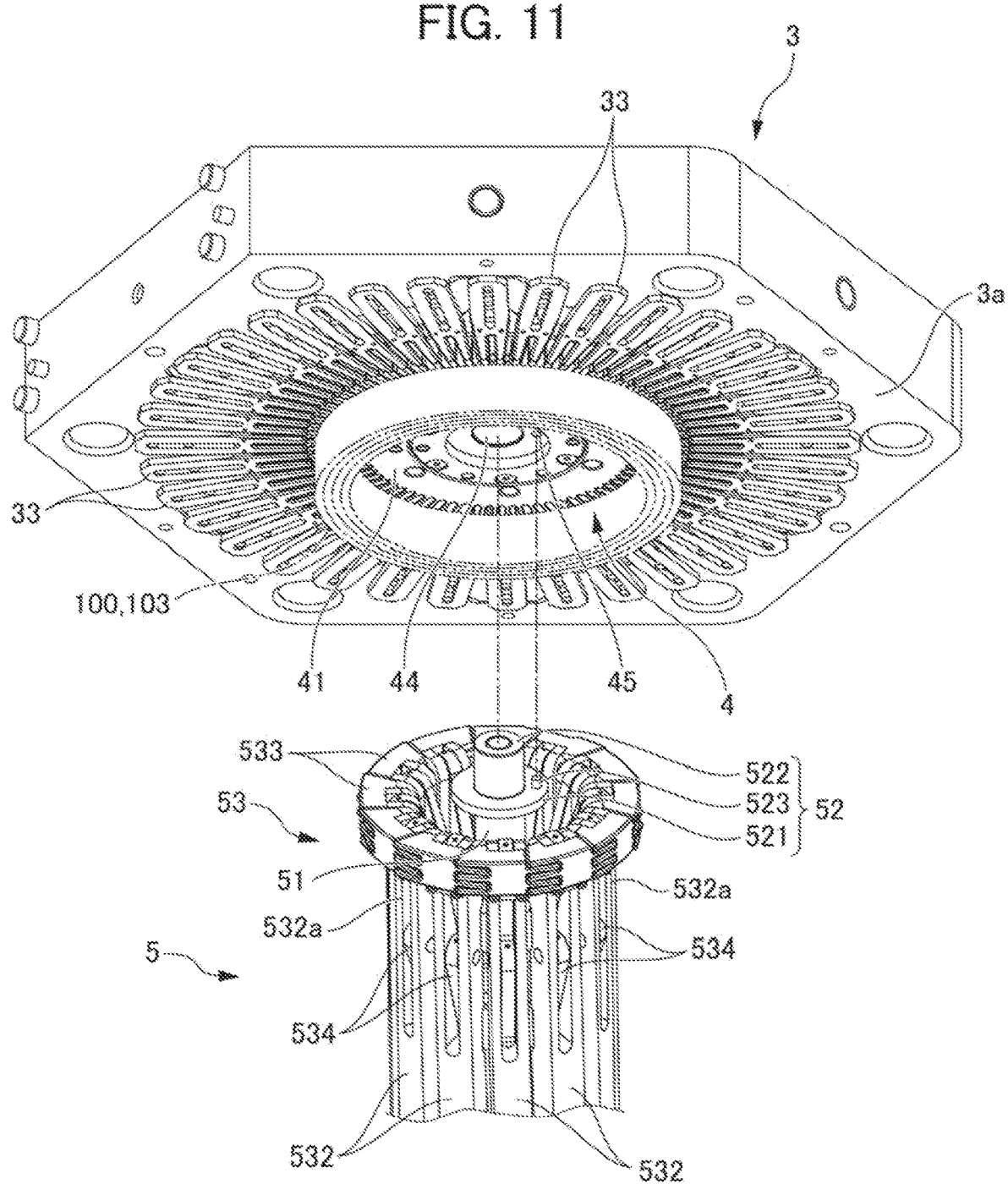
FIG. 11 is a perspective view showing a coil winding jig inserted inside the stator core and a holder of the coil insertion device.

As shown in FIGS. 10 and 11, the coil insertion device 5 has, in the center thereof, a main shaft 51 extending from the support board 12 toward the coil winding jig 4 inserted inside the stator core 2. The main shaft 51 has, at its leading end, a holder 52 for holding the coil winding jig 4 at a predetermined position and in a predetermined posture inside the stator core 2. The holder 52 has a circular end plate 521 disposed at the leading end of the main shaft 51, a shaft protrusion 522 protruding from the center of the circular end plate 521, and one positioning protrusion 523 protruding in the same direction as the shaft protrusion 522 from a portion of the end plate 521 that is located radially outside with respect to the shaft protrusion 522. The shaft protrusion 522 fits into the shaft hole 44 of the coil winding jig 4. The positioning protrusion 523 fits into one positioning hole 45 provided in a portion of the coil winding jig 4 that is radially outside of the shaft hole 44.

The positioning hole 45 of the coil winding jig 4 and the positioning protrusion 523 of the holder 52 are positioned in advance so that the phase of the slots 22 of the stator core 2 to be fixed to the stator core fixing jig 3 and the phase of the inter-comb-teeth grooves 43 of the coil winding jig 4 inserted inside the stator core 2 match each other when the positioning hole 45 of the coil winding jig 4 and the positioning protrusion 523 of the holder 52 are fitted to each other. Therefore, when the coil insertion device 5 is moved to the stator core fixing jig 3 and the shaft protrusion 522 and the positioning protrusion 523 of the holder 52 are fitted into the shaft hole 44 and the positioning hole 45 of the coil winding jig 4 respectively, as shown in FIG. 5, the coil winding jig 4 is held while the inter-comb-teeth grooves 43 are matched in phase with the slots 22 of the stator core 2. As a result, the inside of each slot 22 of the stator core 2 and the inside of the corresponding inter-comb-teeth groove 43 of the coil winding jig 4 communicate with each other in the radial direction.

The coil insertion device 5 has a coil expander 53 surrounding the outer periphery the main shaft 51. The coil expander 53 includes a movable cylinder 531 that fits onto the outer periphery of the main shaft 51, a plurality of movable arms 532 that are arranged further outside the movable cylinder 531, and a plurality of piece members 533 provided at the tips of the movable arms 532 on a one-to-one basis.

The movable cylinder 531 is smaller in length than the main shaft 51, and is slidable in the axial direction of the main shaft 51 by driving an actuator 54, such as a cylinder, arranged behind the support board 12.

The plurality of movable arms 532 extend in the axial direction of the main shaft 51, and are arranged around the outer periphery of the movable cylinder 531 at regular intervals in the circumferential direction. The coil expander 53 of the present embodiment has twelve movable arms 532 arranged along the circumferential direction of the main shaft 51. The support board 12 has, on its surface, twelve guide rails 121 extending radially outward and arranged in the radial direction with the main shaft 51 centered. Rear ends 532b of the movable arms 532 are attached so as to be movable along the guide rails 121. The movable arms 532 bend from the guide rails along the axial direction of the movable cylinder 531 and extend to the vicinity of the outer periphery of the holder 52. The tips 532a of the movable arms 532 are connected to the outer peripheral surface on the tip portion of the movable cylinder 531 via every two link portions 534 which are rotatably attached.

Figure 13:
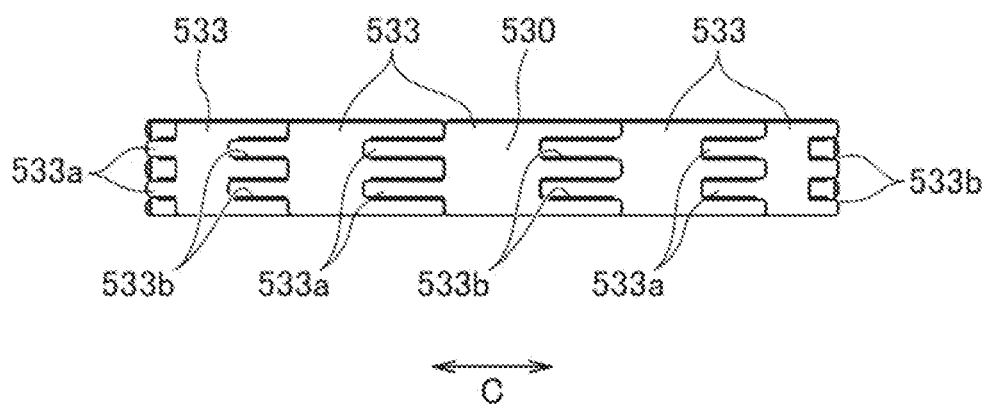
FIG. 13 is a side view showing the coil expander of the coil insertion device in a diameter-reduced state (first position)
Figure 14:
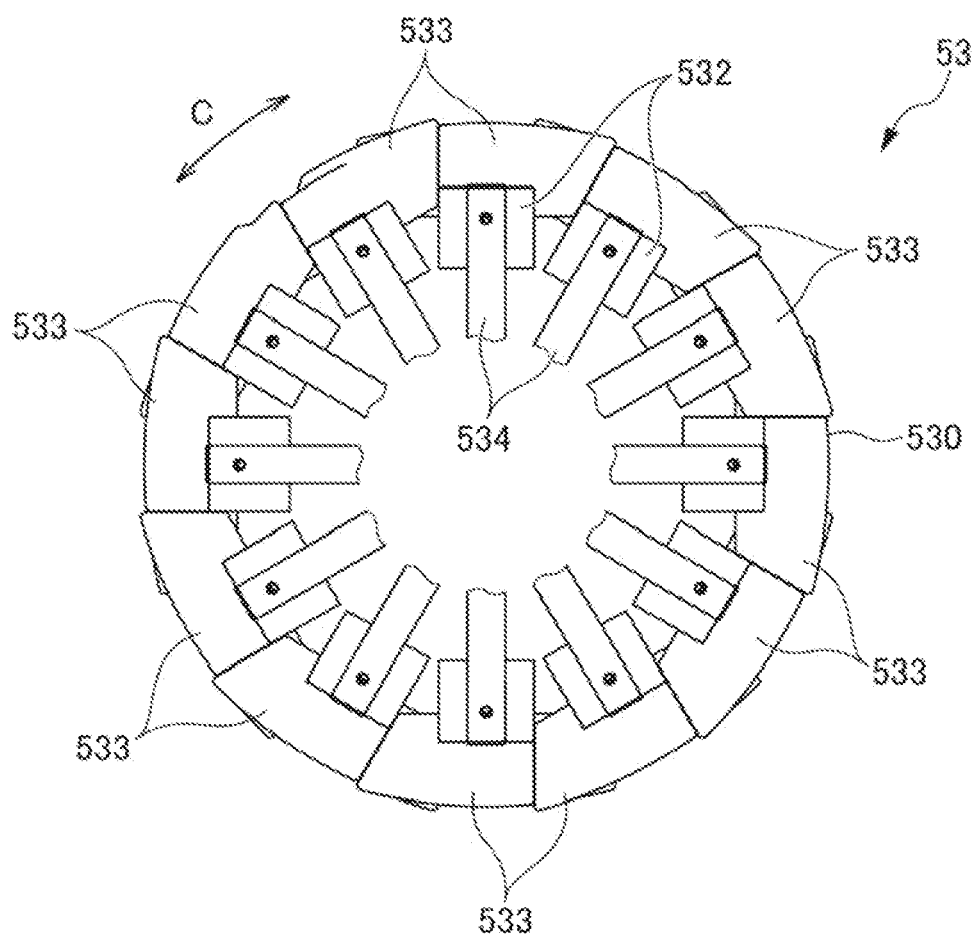
FIG. 14 is a front view showing the coil expander of the coil insertion device in a diameter-reduced state (first position)

The piece members 533 have a substantially fan shape, and are provided to the tips of the movable arms 532 on a one-to-one basis. Therefore, the coil expander 53 of the present embodiment has twelve piece members 533 arranged in an annular shape. As shown in FIGS. 13 and 14, each of the piece members 533 has a pair of fitting projections 533a at one end portion in the circumferential direction of the coil expander 53 (the circumferential direction of the plurality of annular piece members 533), and has a pair of fitting grooves 533b that are fittable to the pair of fitting projections 533a, at the other end portion in the circumferential direction of the coil expander 53. The pair of engagement protrusions 533a are adjacent in the axial direction of the coil expansion portion 53, and protrudes in parallel toward the circumferential direction of the coil expansion portion 533. The twelve piece members 533 are annularly arranged around the outer periphery of the holder 52 in such a manner that adjacent piece members 533, 533 engage with each other via the pair of fitting projections and the pair of fitting grooves 533b thereof. The circumferential direction of the coil expander 53 is indicated as the C direction in FIGS. 13, 14, 16 and 17.

Figure 12:
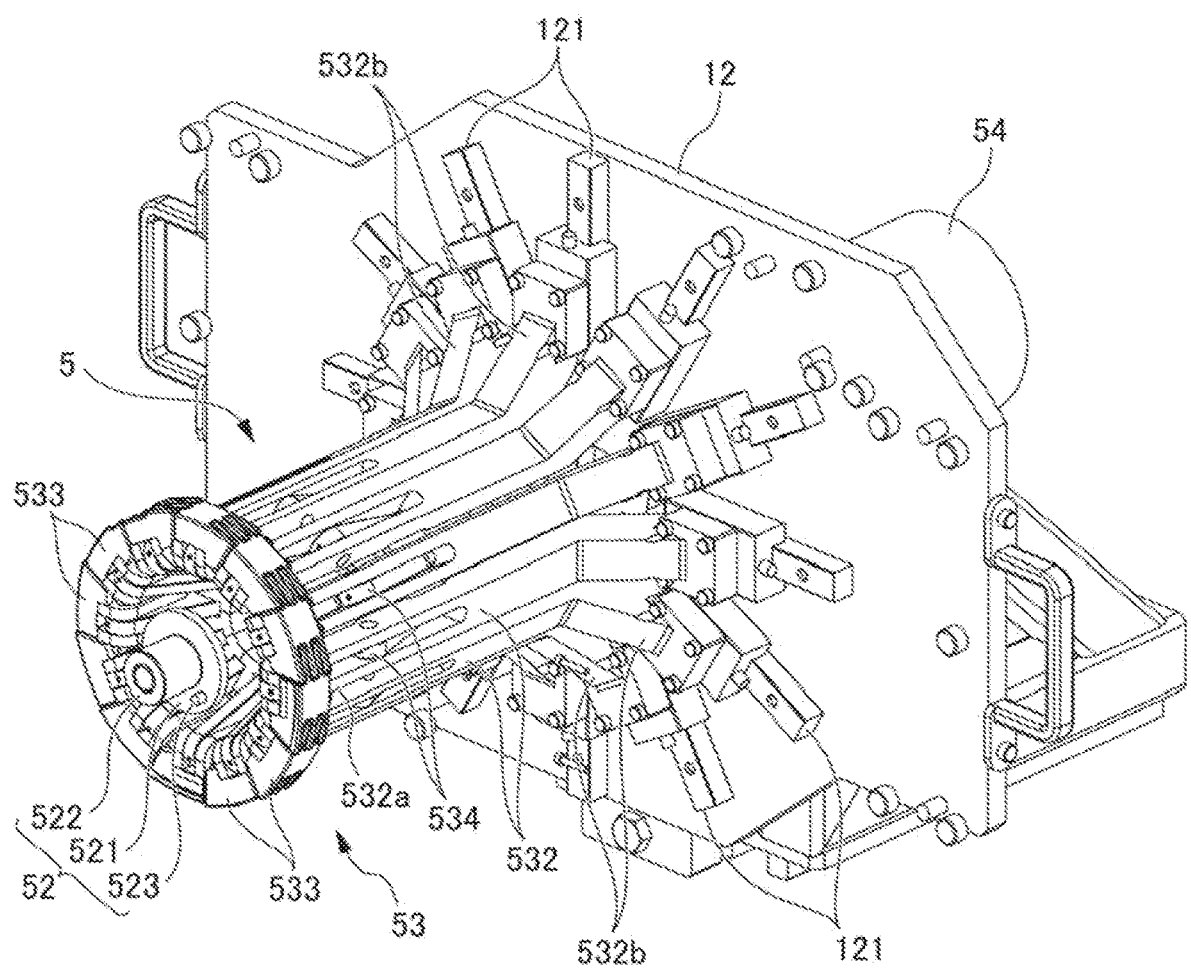
FIG. 12 is a perspective view showing a coil expander of the coil insertion device in a diameter-reduced state (first position)

The coil expander 53 of the coil insertion device 5 shown in FIGS. 10, 11 and 12 is in a state in which the movable cylinder 531 is retracted toward a rear end of the main shaft 51 (toward the support board 12). At this time, the movable arms 532 move toward the inner ends of the radial guide rails 121, and are positioned closest to the outer peripheral surface of the movable cylinder 531. As a result, as shown in FIGS. 13 and 14, the coil expander 53 is brought into a state in which the twelve piece members 533 are in tight contact with one another and arranged in a first position where the diameter thereof is minimized. The outer diameter of the coil expander 53 when the piece members 533 are in the first position is slightly smaller than the inner diameter of the cylindrical shape formed by the coil end portion 103 protruding in the axial direction from the coil winding jig 4 having the belt-shaped coil 100 wound therearound. While the plurality of piece members 533 of the coil expander 53 are in the first position, the coil insertion device 5 is inserted in the coil end portions 103 forming the cylindrical shape by protruding in the axial direction of the coil winding jig 4, and holds the coil winding jig 4 by the holder 52.

Figure 15:
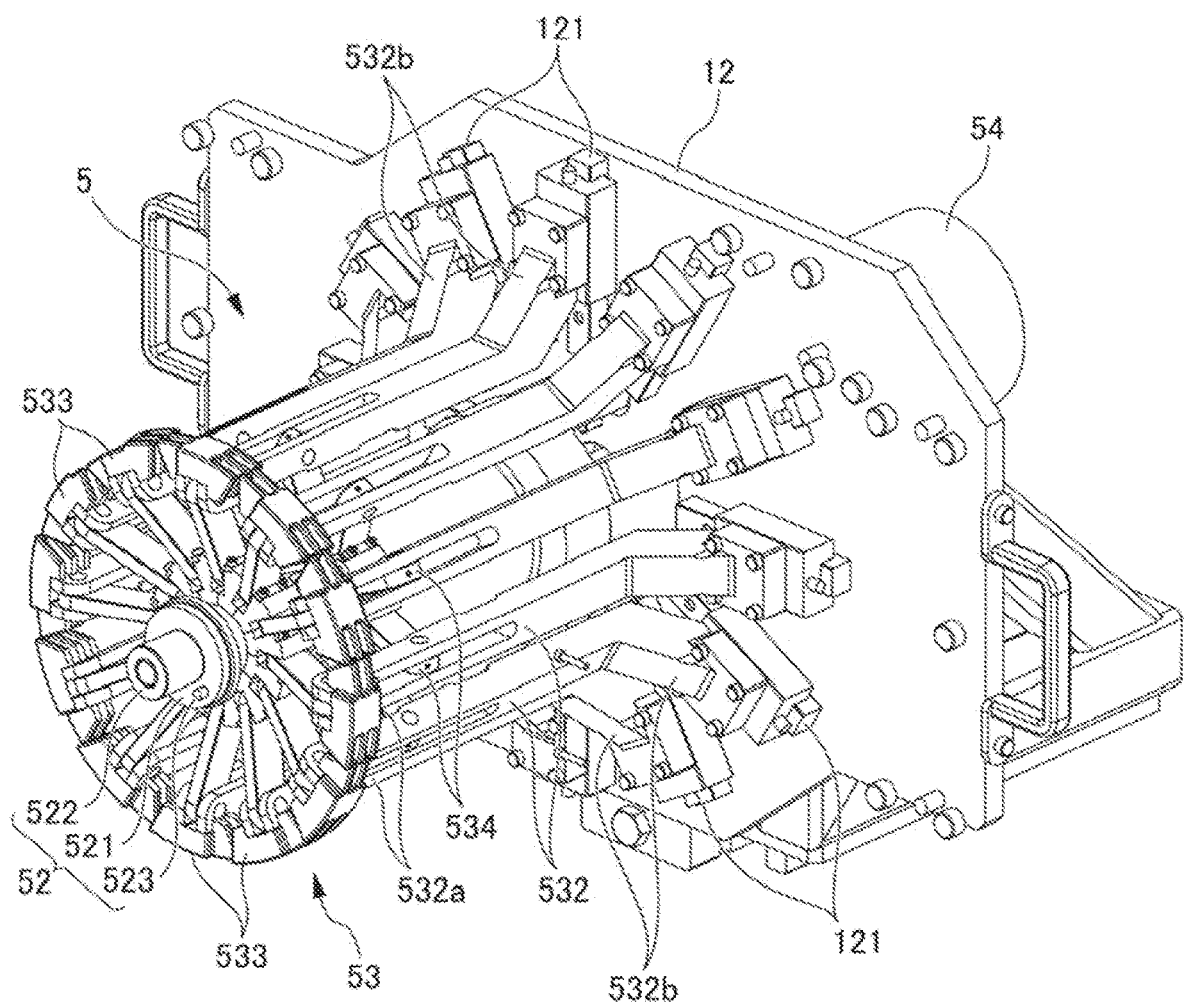
FIG. 15 is a perspective view showing the coil expander of the coil insertion device in a diameter-increased state (second position)
Figure 16:
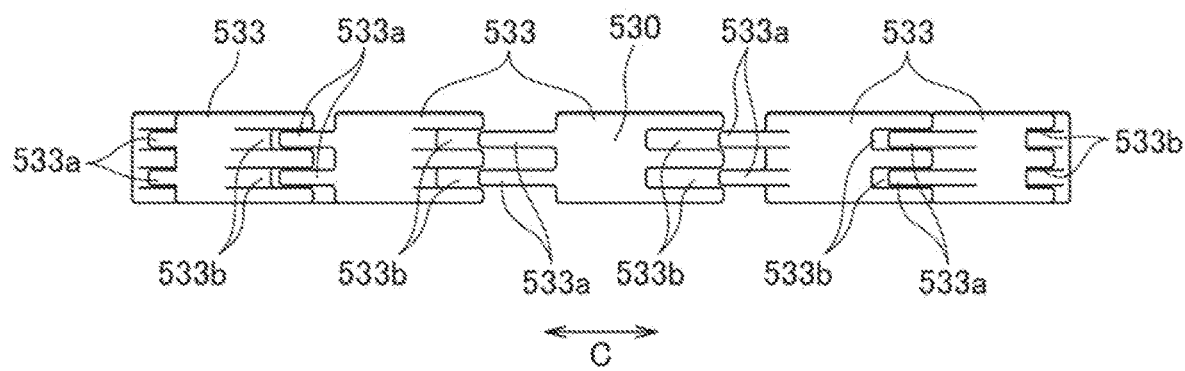
FIG. 16 is a side view showing the coil expander of the coil insertion device in a diameter-increased state (second position)
Figure 17:
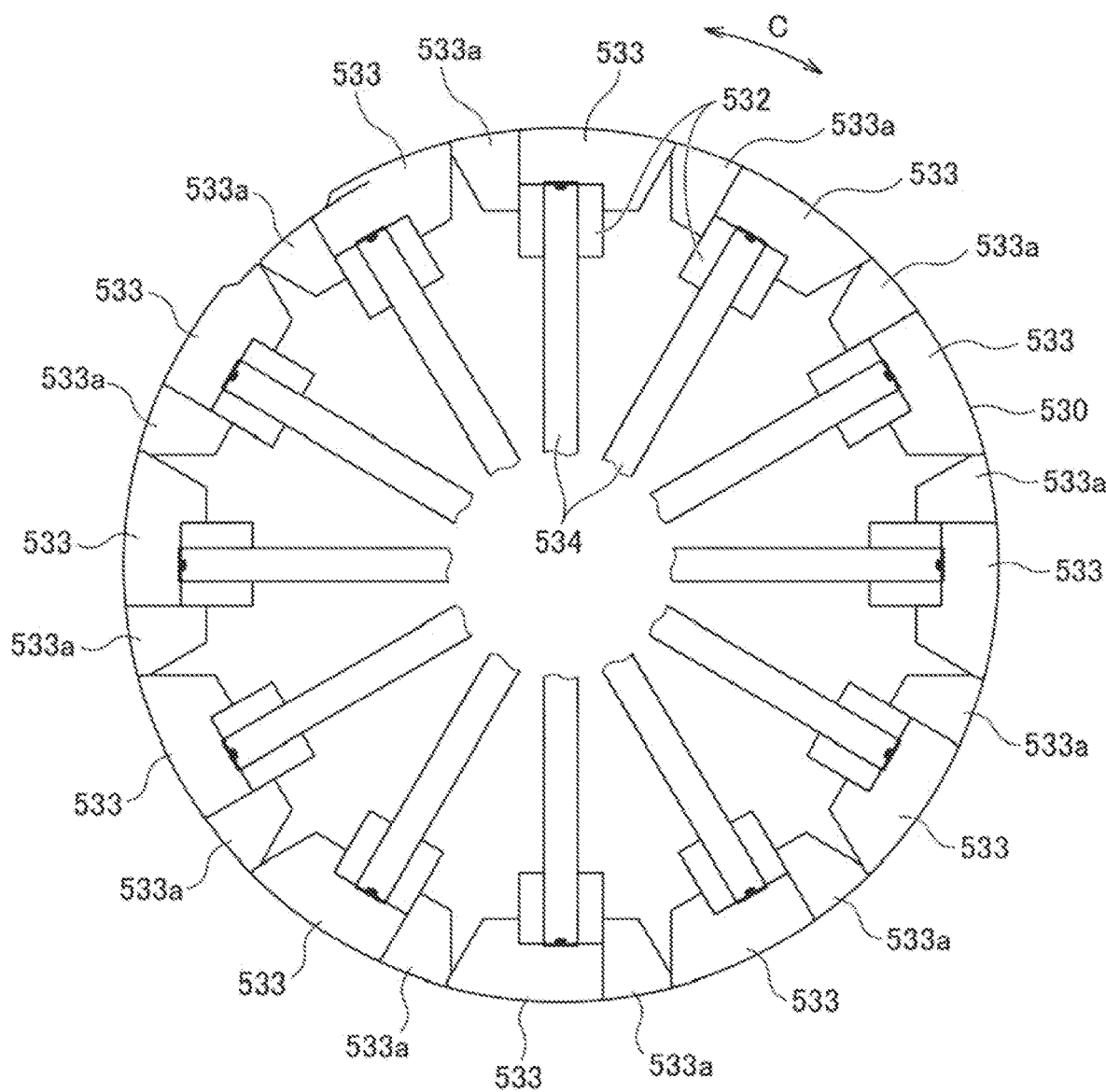
FIG. 17 is a front view showing the coil expander of the coil insertion device in a diameter-increased state (second position)

Next, when the movable cylinder 531 advances toward the coil winding jig 4 along the main shaft 51 by driving the actuator 54, the link portions 534 connected to the movable cylinder 531 are turned so as to protrude radially outward with respect the movable cylinder 531, thereby translating the movable arms 532 outwardly along the guide rails. As a result, the twelve movable arms 532 are separated radially outward from the movable cylinder 531. At this time, as shown in FIGS. 15, 16 and 17, the coil expander 53 is brought into a state where the adjacent piece members 533 are moved to be expanded and arranged in a second position where the diameter thereof is minimized. The outer diameter of the coil expander 53 when the piece members 533 are in the second position is slightly larger than the outer diameter of the coil winding jig 4.

As shown in FIGS. 16 and 17, when the piece members 533 are in the second position and thus the coil expander 53 most expands in diameter, the adjacent piece members 533, 533 separate from each other, while each pair of fitting projections 533a protrude in the circumferential direction between the piece members 533, 533. The fitting projections 533a do not completely come out of the fitting grooves 533b of the adjacent piece member 533, and maintain the fitting in the fitting grooves 533b. Therefore, the plurality of annularly-arranged piece members 533 in the second position have a closed outer peripheral surface 530 that is continuous in the circumferential direction in both the first position and the second position. Therefore, when the coil expander 53 is viewed in the circumferential direction, the adjacent piece members 533, 533 are continuous with each other via a pair of fitting projections 533a, and such a groove (gap) as to penetrate the coil expander 53 in the radial direction is not formed.

Next, a method for inserting the belt-shaped coil 100 wound around the coil winding jig 4 into the slots 22 from the inside of the stator core 2 fixed to the stator core fixing jig 3, while using the coil mounting apparatus 1 will be described.

Figure 18:
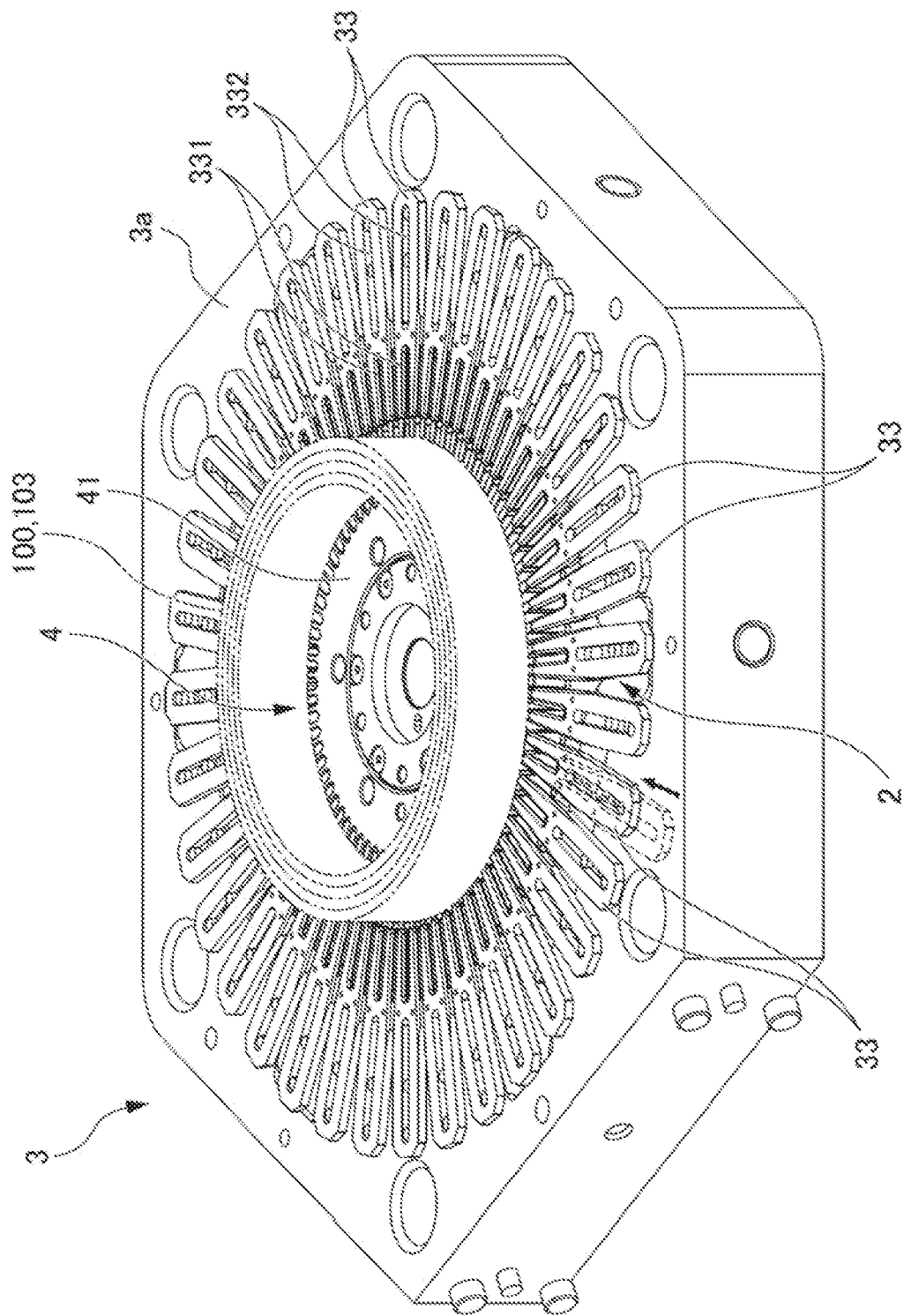
FIG. 18 is a perspective view showing a state in which insulating paper sheets in the slots of the stator core are supported by cuff guides.

Before insertion of the coil winding jig 4 into the stator core 2, the coil winding step described above is performed so that the belt-shaped coil 100 is annularly wound around the coil winding jig 4. After the coil winding jig 4 having the belt-shaped coil 100 annularly wound therearound is inserted inside the stator core 2 fixed to the stator core fixing jig 3, the cuff guides 33 are moved inward in the radial direction by driving an actuator (not shown), as shown in FIG. 18.

Figure 19:
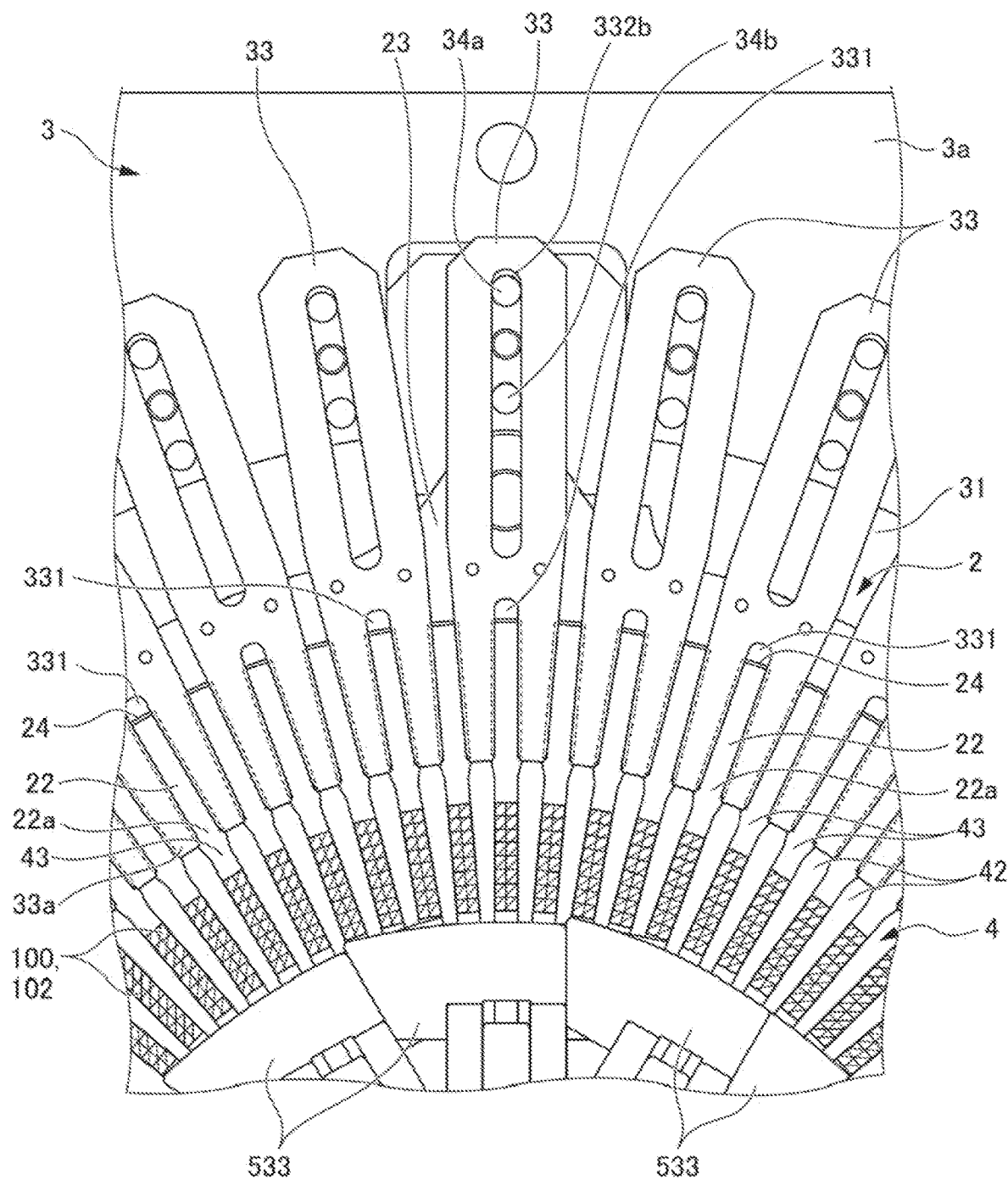
FIG. 19 is a partially enlarged view showing a state in which the insulating paper sheets in the slots of the stator core are supported by the cuff guides.

In a state where the cuff guides 33 have been moved inward in the radial direction, as shown in FIG. 19, the guide grooves 331 of the cuff guides 33 support the cuff portions 24a of the insulating paper sheets 24 in the corresponding slots 22 from both sides in the circumferential direction. At this time, just like the guide grooves 331, the inner ends 33a, 33a of the cuff guides 33, 33 adjacent to each other in the circumferential direction also support the cuff portion 24a of the insulating paper sheet 24 in the slot between the cuff guides 33, 33 from both sides in the circumferential direction. Since the notch width of each guide groove 331 and the separation distance between the inner ends 33a, 33a of the adjacent cuff guides 33, 33 are slightly smaller than the width of the slot 22 in the circumferential direction, the insulating paper sheet 24 whose cuff portion 24a is supported from both sides by the guide groove 331 and the insulating paper sheet 24 whose cuff portion 24a is supported from both sides by the adjacent cuff guides 33, 33 are positioned at a predetermined position in the respective slots 22.

Although the coil insertion device 5 that holds the coil winding jig 4 is not shown in FIG. 18, the operation that causes the cuff guides 33 to support the cuff portions 24a is performed at an appropriate timing after the stator core 2 is fixed to the stator core fixing jig 3 and before the belt-shaped coil 100 is inserted into the slots 22 of the stator core 2 by way of an operation of the coil expander 53, as will be described later.

The coil winding jig 4 inserted inside the stator core 2 is held by the holder 52 of each of the coil insertion devices 5 by the movement of the coil insertion device 5 to the coil winding jig 4. At this time, the piece members 533 of the coil expander 53 are in the first position in which the diameter thereof is reduced to be smaller than the inner diameter of the belt-shaped coil 100 in a wound state, and are inserted inside the coil end portions 103 of the wound belt-shaped coil 100 (piece member insertion step).

Figure 20:
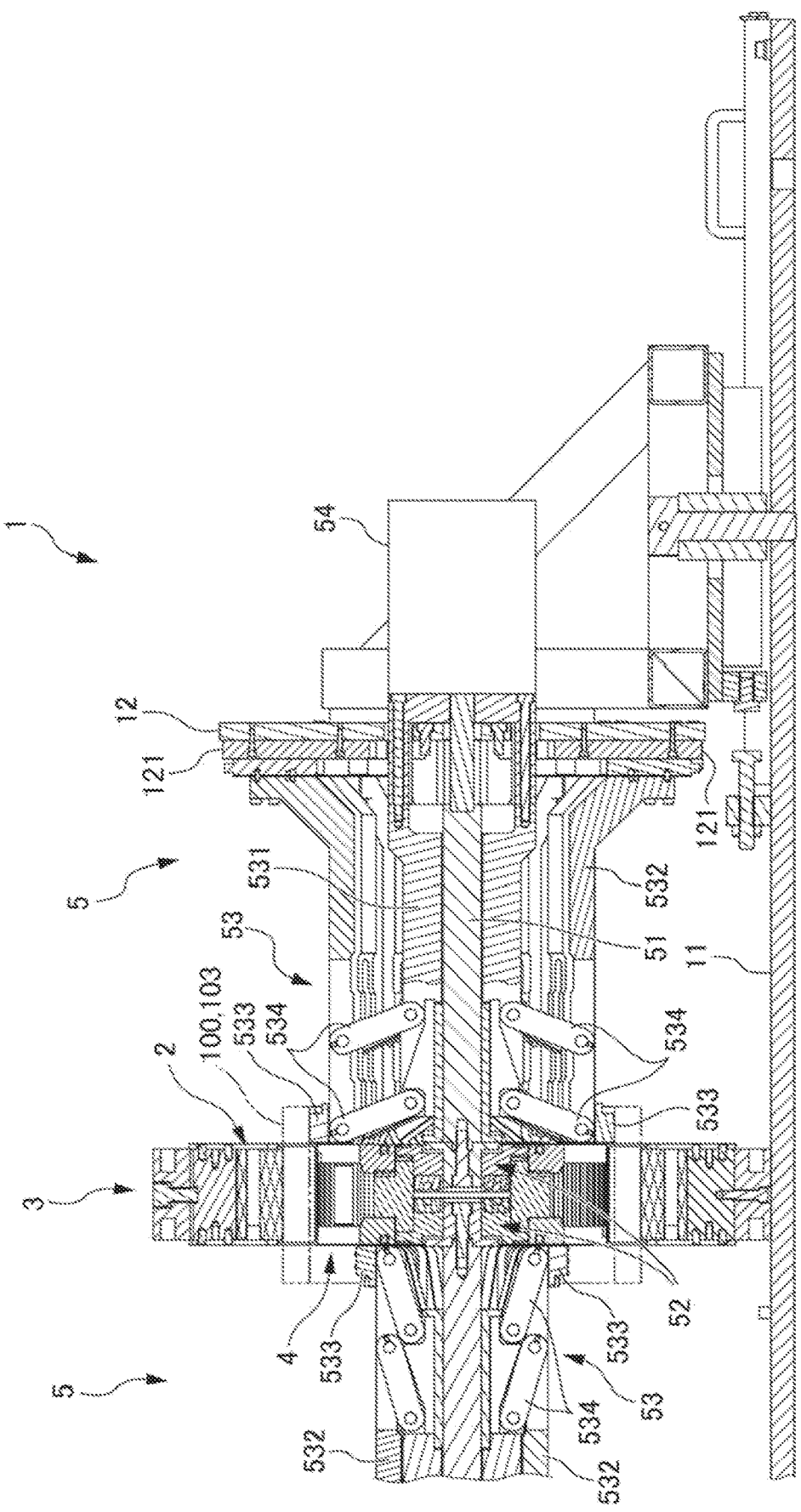
FIG. 20 is a cross-sectional side view showing an aspect in which the belt-shaped coil in the coil winding jig fixed to the stator core fixing jig is moved to expand in diameter by the coil insertion device.
Figure 21:
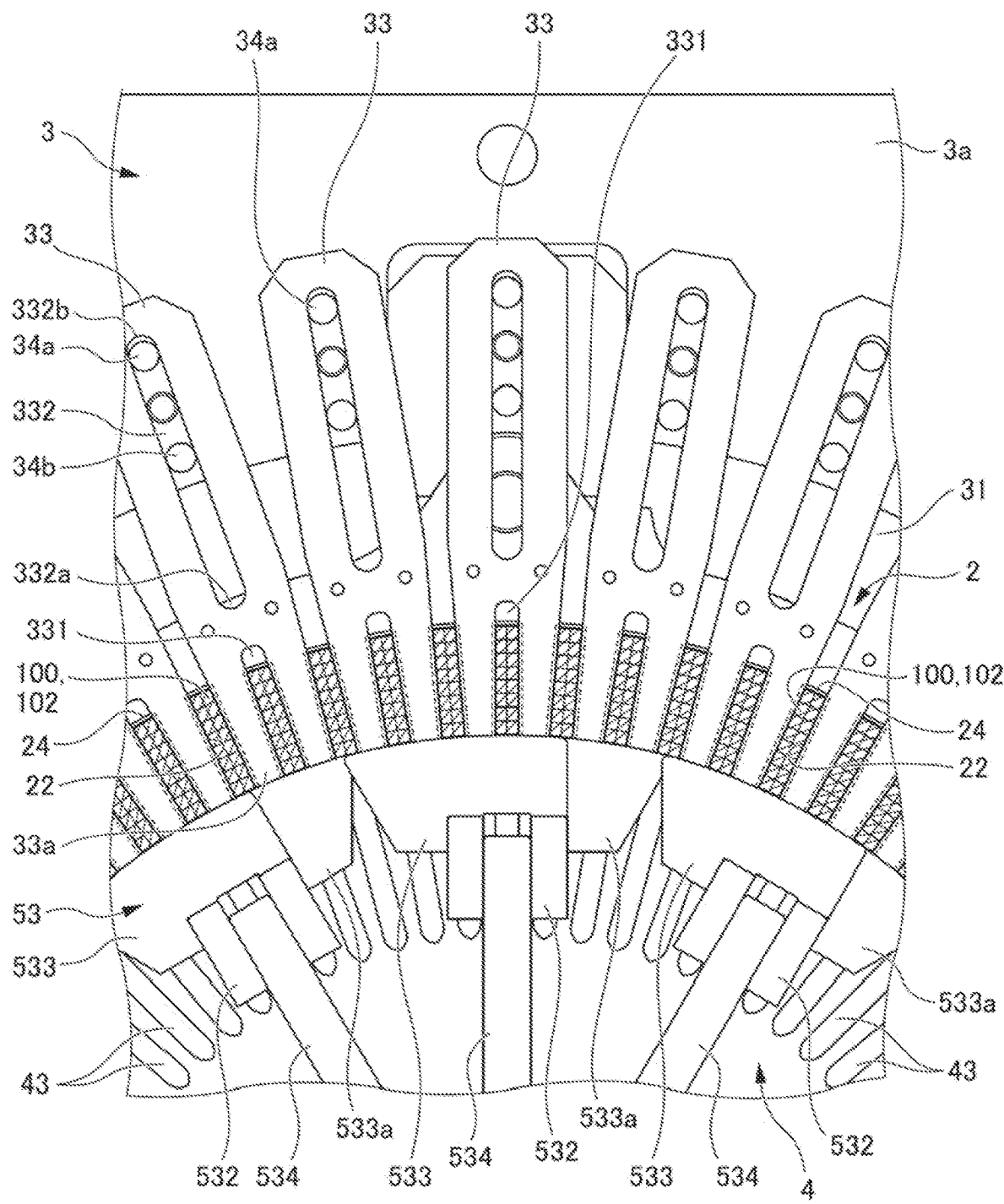
FIG. 21 is a partially enlarged view showing a state in which the belt-shaped coil moved and expanded in diameter by the coil insertion device is inserted into slots of the stator core.

Further, after the insulating paper sheets 24 in the slots 22 are positioned by the cuff guides 33, as shown in FIGS. 20 and 21, the annularly-arranged piece members 533 of the coil expander 53 of the coil insertion device 5 are moved from the first position to the diameter-increased second position by driving the actuator 54. As a result, the piece members 533 of the coil expander 53 press the coil end portions 103 of the belt-shaped coil 100 wound around the coil winding jig 4 from inside toward outside with respect to the belt-shaped coil 100. The belt-shaped coil 100 pressed by the coil expanders 53 gradually expands over the entire periphery thereof. This expansion causes the straight portions 102 to move toward the slots 22 of the stator core 2 which communicate with the inter-comb-teeth grooves 43, while being guided by the inter-comb-teeth grooves 43. Therefore, the straight portions 102 of the belt-shaped coil 100 are inserted into the slots 22 of the stator core 2 at once from the openings 22a of the slots 22 without interfering with the slots 22 (coil insertion step).

At this time, since the insulating paper sheets 24 in the slots 22 are positioned at a predetermined position by the cuff guides 33. In addition, since the groove width of the inter-comb-teeth grooves 43 is slightly smaller than the opening width of the openings 22a of the slots 22, the straight portions 102 of the belt-shaped coil 100 can smoothly pass through the openings 22a of the slots 22, and are prevented from catching the insulating paper sheets 24.

Figure 22:
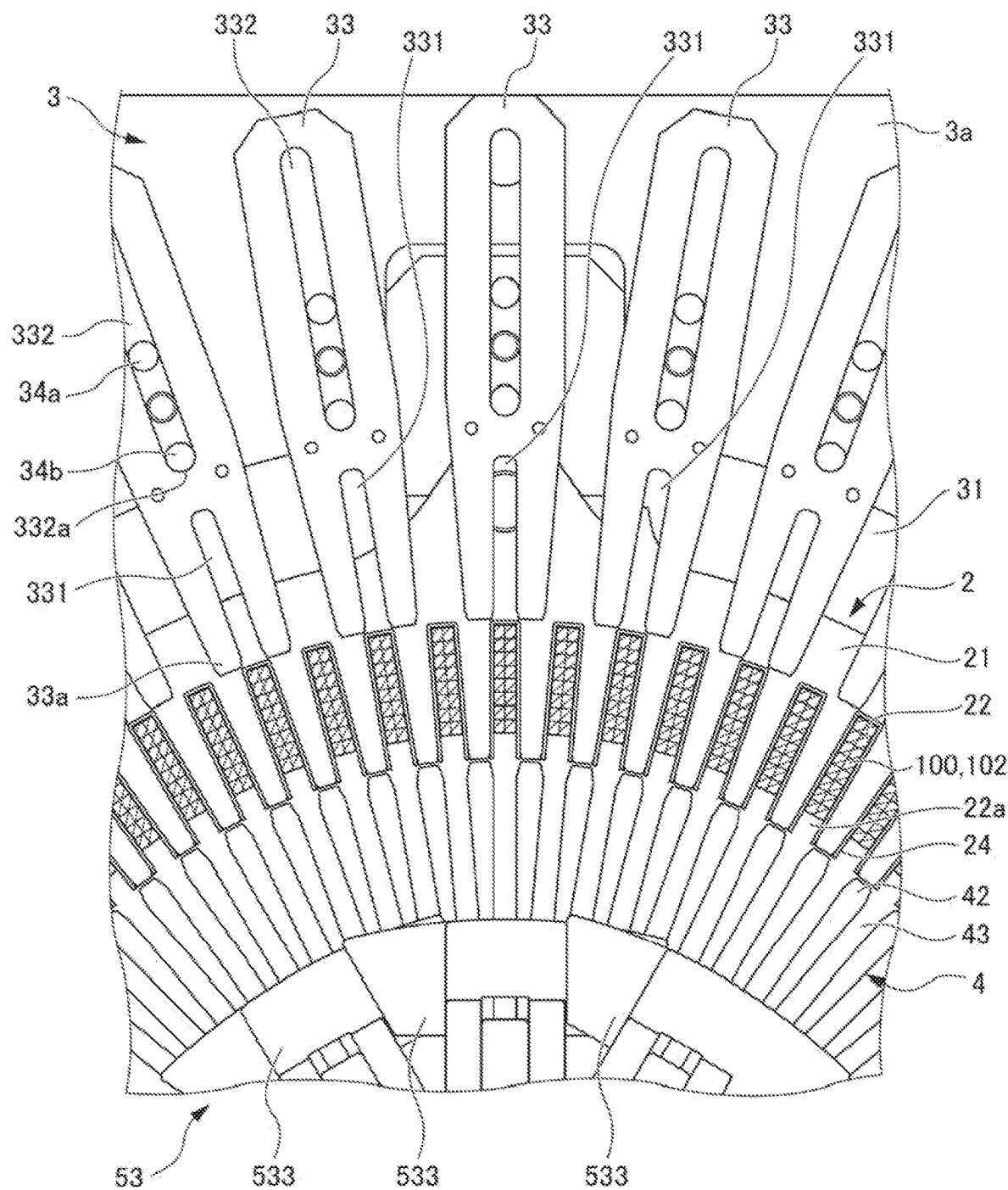
FIG. 22 is a partially enlarged view showing a state in which the cuff guides have been retracted after insertion of the belt-shaped coil into the slots.

When the coil expanders 53 of the two coil insertion devices 5 are most expanded in diameter, the straight portions 102 of the belt-shaped coil 100 on the coil winding jig 4 are fully inserted into the slots 22 of the stator core 2 as shown in FIG. 22, whereby the belt-shaped coil 100 is mounted in the slots 22 of the stator core 2. The coil expanders 53 of the two coil insertion devices 5 may operate so as to expand in diameter the respective sets of the piece members 533 simultaneously with each other, or operate so as to sequentially expand in diameter the respective sets of with a time lag so that the straight portions 102 are inserted into the openings 22a of the slots 22 obliquely with respect to the radial direction.

Figure 23:
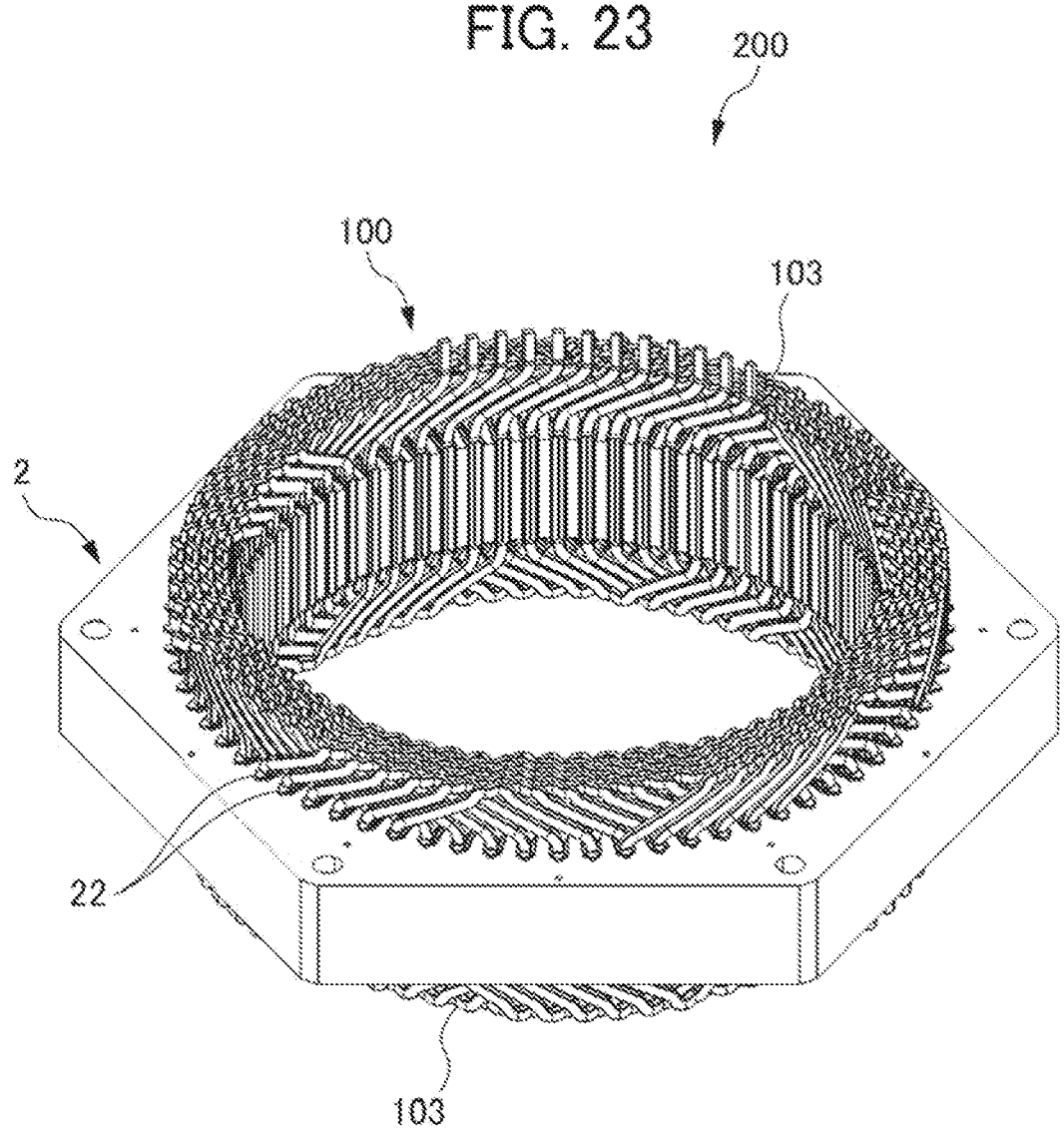
FIG. 23 is a perspective view showing a stator having the belt-shaped coil mounted in the slots along the circumferential direction.

Thereafter, the cuff guides 33 move radially outward and completely retract from the end face of the stator core 2, and the piece members 533 of each coil expander 53 are reduced in diameter to be returned to the first position, and each of the coil insertion devices 5 is separated from the coil winding jig 4. As a result, as shown in FIG. 23, a stator 200 including the stator core 2 that has the belt-shaped coil 100 mounted in the slots 22 of the stator core 2 is produced.

As described above, the coil insertion device 5 of the present embodiment expands the wound belt-shaped coil 100 that is placed in the through-hole 20 of the stator core 2 so as to move the belt-shaped coil 100 from inside toward outside with respect to the stator core 2, whereby the belt-shaped coil 100 is inserted into the slots 22 that open to the through-hole 20. The coil insertion device 5 includes the coil expander 53 including the plurality of piece members 533 arranged in an annular shape. The plurality of piece members 533 are movable between a first position where they are reduced in diameter so as to be insertable inside the coil end portions 103 of the wound belt-shaped coil 100, and a second position where they are expanded in diameter from the first position so as to press the coil end portions 103 of the wound belt-shaped coil 100 from inside toward outside, whereby the belt-shaped coil 100 is inserted into the slots 22 at once. According to this configuration, the plurality of piece members 533 are expanded in diameter from the first position to the second position inside the coil end portions 103 of the wound belt-shaped coil 100, whereby the wound belt-shaped coil 100 can be expanded in diameter over the entire periphery thereof at once and moved from inside toward outside with respect to the stator core 2. Therefore, the straight portions 102 of the belt-shaped coil 100 can be efficiently and stably inserted from the inside of the stator core 2 into the slots 22.

The plurality of piece members 533 of the present embodiment have a closed outer peripheral surface 530 that is continuous in the circumferential direction in both the first position and the second position. According to this configuration, no groove (gap) is formed between the adjacent piece members 533 and 533, so that the straight portions 102 of the belt-shaped coil 100 can be further stably inserted from the inside of the stator core 2 into the slots 22 without disturbing the posture of the wound belt-shaped coil 100.

The coil insertion method of the present embodiment includes expanding the wound belt-shaped coil 100 arranged in the through-hole 20 of the stator core 2 to move the belt-shaped coil 100 from inside toward outside with respect to the stator core 2, and thereby inserting the belt-shaped coil 100 into the slots 22 which opens to the through-hole 20. The coil insertion method includes a piece member insertion step of arranging the plurality of annularly-arranged piece members 533 in the first position where the diameter thereof is reduced to be smaller than the inner diameter of the wound belt-shaped coil 100, and inserting the piece members 533 into the coil end portions 103 of the belt-shaped coil in the wound state, and a coil insertion step of moving the plurality of piece members 533 from the first position to the diameter-increased second position to expand the wound belt-shaped coil 100 from inside toward outside, thereby inserting the wound belt-shaped coil 100 into the slots 22 of the stator core 2 at once. According to this feature, the plurality of piece members 533 are expanded in diameter from the first position to the second position inside the coil end portions 103 of the wound belt-shaped coil 100, whereby the belt-shaped coil 100 can be expanded over the entire periphery thereof at once and moved from inside toward outside. Therefore, the straight portions 102 of the belt-shaped coil 100 can be efficiently and stably inserted from the inside of the stator core 2 into the slots 22.

The coil mounting apparatus 1 of the embodiment described above is configured so that the axial directions of the stator core 2 and the coil winding jig 4 are set parallel to a horizontal direction, but it may be configured so that the axial directions of the stator core 2 and the coil winding jig 4 are set to any direction other than the horizontal direction, such as a vertical direction.

The coil winding jig 4 having the belt-shaped coil 100 annularly wound therearound may be inserted inside the stator core 2 fixed to the stator core fixing jig 3, while being held by the holder 52 of any one of the coil insertion devices 5.

EXPLANATION OF REFERENCE NUMERALS

2: stator core
20: through-hole
22: slot
5: coil insertion device
53: coil expander
530: outer peripheral surface
533: piece member
100: belt-shaped coil

What is claimed is:

1. A coil insertion device for inserting a wound coil into slots formed in a stator core and opening to a through-hole of the stator core, by placing the coil in the through-hole, and by expanding the coil to move the coil from inside toward outside with respect to the stator core, the coil insertion device comprising:
   a coil expander including a plurality of piece members arranged in an annular shape,
   wherein the plurality of piece members are movable between a first position where the plurality of piece members are reduced in diameter so as to be insertable inside the wound coil, and a second position where the plurality of piece members are expanded in diameter from the first position so as to press the wound coil from inside toward outside, thereby inserting the wound coil into the slots at once, and
   wherein the plurality of piece members are brought into the second position by moving adjacent ones of the plurality of piece members away from each other,
   wherein each piece member has a pair of fitting projections at one end portion in a circumferential direction of the coil expander and a pair of fitting grooves at the other end in the circumferential direction of the coil expander, the pair of fitting grooves being fittable to the pair of fitting projections, and
   wherein the pair of fitting projections are adjacent in an axial direction of the coil expander, and protrude in parallel in the circumferential direction of the coil expander.

2. The coil insertion device according to claim 1, wherein the plurality of piece members have a closed outer peripheral surface that is continuous in a circumferential direction in both the first position and the second position.

3. A coil insertion method for inserting a wound coil into slots formed in a stator core and opening to a through-hole of the stator core, by placing the wound coil in the through-hole, and by expanding the coil to move the coil from inside toward outside with respect to the stator core, the coil insertion method comprising:
   a piece member insertion step including bringing a plurality of piece members arranged in an annular shape into a first position where the plurality of piece members are reduced in diameter to be smaller than an inner diameter of the wound coil and inserting the plurality of piece members inside the wound coil; and
   a coil insertion step including expanding the wound coil from inside toward outside by moving the plurality of piece members from the first position to a second position where the plurality of piece members are expanded in diameter, thereby inserting the wound coil into the slots of the stator core at once, wherein each piece member has a pair of fitting projections at one end portion in a circumferential direction of a coil expander and a pair of fitting grooves at the other end in the circumferential direction of the coil expander, the pair of fitting grooves being fittable to the pair of fitting projections.

4. The coil insertion device according to claim 3, wherein the plurality of piece members are brought into the second position by moving adjacent ones of the plurality of piece members away from each other.

5. A coil insertion device for inserting a wound coil into slots formed in a stator core and opening to a through-hole of the stator core, by placing the coil in the through-hole, and by expanding the coil to move the coil from inside toward outside with respect to the stator core, the coil insertion device comprising:

a coil expander including a plurality of piece members arranged in an annular shape, wherein the plurality of piece members are movable between a first position where the plurality of piece members are reduced in diameter so as to be insertable inside the wound coil, and a second position where the plurality of piece members are expanded in diameter from the first position so as to press the wound coil from inside toward outside, thereby inserting the wound coil into the slots at once, and wherein each piece member has a pair of fitting projections at one end portion in a circumferential direction of the coil expander and a pair of fitting grooves at the other end portion in the circumferential direction of the coil expander, the pair of fitting grooves being fittable to the pair of fitting projections.

6. The coil insertion device according to claim 5, wherein the plurality of piece members have a closed outer peripheral surface that is continuous in a circumferential direction in both the first position and the second position.

7. The coil insertion device according to claim 5, wherein the plurality of piece members are brought into the second position by moving adjacent ones of the plurality of piece members away from each other.

8. The coil insertion device according to claim 5, wherein the pair of fitting projections are adjacent in an axial direction of the coil expander, and protrude in parallel in the circumferential direction of the coil expander.

* * * * *